US009892561B2

(12) United States Patent
Choukroun et al.

(10) Patent No.: US 9,892,561 B2
(45) Date of Patent: Feb. 13, 2018

(54) METHOD OF HIDING AN OBJECT IN AN IMAGE OR VIDEO AND ASSOCIATED AUGMENTED REALITY PROCESS

(71) Applicant: FITTINGBOX, Labege (FR)

(72) Inventors: Ariel Choukroun, Toulouse (FR); Jerome Guenard, Chevannes (FR)

(73) Assignee: FITTINGBOX, Labege (FR)

( * ) Notice: Subject to any disclaimer, the term of this patent is extended or adjusted under 35 U.S.C. 154(b) by 0 days.

(21) Appl. No.: 15/285,554

(22) Filed: Oct. 5, 2016

(65) Prior Publication Data
US 2018/0005448 A1    Jan. 4, 2018

(30) Foreign Application Priority Data
Jun. 30, 2016  (FR) .................... 16 56154

(51) Int. Cl.
| G06T 19/00 | (2011.01) |
| G06T 5/00 | (2006.01) |
| G06T 5/50 | (2006.01) |
| G06T 7/00 | (2017.01) |
| G06T 17/00 | (2006.01) |
| G06T 15/10 | (2011.01) |
| G06K 9/00 | (2006.01) |
| G06F 3/00 | (2006.01) |
| G06Q 30/06 | (2012.01) |
| G06T 7/40 | (2017.01) |

(52) U.S. Cl.
CPC .......... *G06T 19/006* (2013.01); *G06F 3/005* (2013.01); *G06K 9/00255* (2013.01); *G06K 9/00711* (2013.01); *G06Q 30/0643* (2013.01); *G06T 5/005* (2013.01); *G06T 5/50* (2013.01); *G06T 7/004* (2013.01); *G06T 7/408* (2013.01); *G06T 15/10* (2013.01); *G06T 17/00* (2013.01); *G06Q 30/0623* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS

| 2004/0085516 A1* | 5/2004 | Fukuma ............... G02C 13/003 351/227 |
| 2011/0071804 A1* | 3/2011 | Xie .................... G06Q 30/0603 703/1 |

(Continued)

FOREIGN PATENT DOCUMENTS

| WO | 2010/042990 A1 | 4/2010 |
| WO | 2016/020921 A1 | 2/2016 |
| WO | 2016/050729 A1 | 4/2016 |

*Primary Examiner* — James A Thompson
(74) *Attorney, Agent, or Firm* — Im IP Law; C. Andrew Im

(57) ABSTRACT

A method for generating a final image from an initial image including an object suitable to be worn by an individual. The presence of the object in the initial image is detected. A first layer is superposed on the initial image. The first layer includes a mask at least partially covering the object in the initial image. The appearance of at least one part of the mask is modified. The suppression of all or part of an object in an image or a video is enabled. Also, a process of augmented reality intended to be used by an individual wearing a vision device on the face, and a try-on device for a virtual object.

29 Claims, 8 Drawing Sheets

(56) References Cited

U.S. PATENT DOCUMENTS

| | | | |
|---|---|---|---|
| 2012/0313955 A1* | 12/2012 | Choukroun | G06T 7/004 345/582 |
| 2013/0006814 A1* | 1/2013 | Inoue | G06Q 30/0603 705/26.81 |
| 2013/0088490 A1* | 4/2013 | Rasmussen | G06T 17/00 345/421 |
| 2013/0262259 A1* | 10/2013 | Xie | G02C 7/086 705/26.5 |
| 2013/0314410 A1* | 11/2013 | Gravois | G06T 19/006 345/420 |
| 2013/0321412 A1* | 12/2013 | Coon | G06T 17/00 345/420 |
| 2015/0055085 A1 | 2/2015 | Fonte et al. | |
| 2015/0055086 A1* | 2/2015 | Fonte | G06Q 30/0621 351/178 |
| 2016/0178936 A1* | 6/2016 | Yang | G06T 17/00 351/246 |

* cited by examiner

FIG. 6(b)  $I_{bg}=Tm_a \cup TM_{bg}$

FIG. 6(c)  $I_{bg} \cup TMB_{g\_f}$

FIG. 6(d)  $I_{bg} \cup TMB_{g\_f} \cup TMB_{g\_e}$

FIG. 6(e)  $I_{bg} \cup TMB_{g\_f} \cup TMB_{g\_e} \cup TB_{fg}$

METHOD OF HIDING AN OBJECT IN AN IMAGE OR VIDEO AND ASSOCIATED AUGMENTED REALITY PROCESS

RELATED APPLICATIONS

This application claims priority from French Patent Application No. 16 56154 filed Jun. 30, 2016, which is incorporated herein by reference in its entirety.

FIELD OF THE INVENTION

The invention relates to the field of image processing and image synthesis.

More specifically, the invention relates to a method of suppressing an object in an image or video.

The invention finds particular application in the field of augmented reality for the trying on of a virtual pair of glasses by an individual while wearing a real pair of glasses.

BACKGROUND OF THE INVENTION

For an individual wearing corrective lenses, it is difficult to try on a new pair of glasses prior to purchasing them. Indeed, new the frames being tried on includes lenses that lack optical correction, and so the user cannot see further than the precision of his visual impairment. Thus, for an average myopic user for example, the user must come within twenty centimeters of the mirror to be able to observe himself. He cannot therefore assess for himself whether or not the new frame suits him. This is even more complex in the case of trying on a pair of sunglasses or tinted lenses which greatly reduce brightness, further decreasing the visibility of the user.

Known in the prior art are techniques for suppressing a pair of glasses in an image, particularly in the context of facial recognition.

These techniques are based on facial recognition, using feature points for detecting eye position. This detection coupled with learning the differences between faces wearing a pair of glasses and those not wearing any, allows the reconstruction of an image of an individual without glasses from an image of an individual wearing a pair glasses.

The major drawback of this technique is that it statistically reconstructs the face from images of individuals from an identical view angle, usually frontal. This technique operates in two dimensions, considering only the interior of the 2D field of the face in the image. In other words, all the elements of the pair of glasses being superimposed on a facial background are not considered by this technique, which is detrimental to images that contain pairs of glasses broader than the face or when the face is not facing front in the image.

Another major disadvantage of this technique is that it only takes into account pairs of glasses with a particularly thin frame, thereby excluding all pairs of glasses with thick frames.

Also known in the prior art are techniques which permit an individual to view himself on a screen by means of an avatar when trying on a new pair of glasses.

These techniques are based on acquiring prior images of the individual not wearing pair of glasses. These images allow to create a virtual model of the individual's head to which the model of the new pair of glasses is added.

The major drawback of this technique is that it does not achieve a realistic technique in which the eyeglass wearer can see his image on the screen as in a mirror, when trying on a new pair of glasses.

Finally, there are augmented reality systems which allow one to try on a virtual pair of glasses.

At present, none of the existing augmented reality systems allows to virtually remove a real object, such as for example a pair of glasses, on one or more individuals wearing such object.

OBJECTIVES OF THE INVENTION

The present invention is aimed at remedying all or part of the disadvantages of the prior art cited above.

One of the main objectives of the invention is to propose a technique which allows a user wearing a real vision device to see himself on a screen, as in a mirror, without the real vision device on the face and to try on a virtual object by replacing on the screen the real vision device which remains on the face.

Another objective of the invention is to propose a technique that is realistic for the user.

Another objective of the invention is to propose a technique that functions in real-time.

Another objective of the invention is to propose a technique which allows the user to try on a virtual object while moving his head in any direction.

An objective of the invention also is to propose a technique for suppressing the visible part of an object, specifically a pair of glasses, in an image or video, but also local light interactions as well such as bright glare from the glasses or cast shadows.

SUMMARY OF THE INVENTION

These objectives, and others that will be subsequently apparent are achieved using a method for generating a final image from an original image comprising an object suitable to be worn by an individual.

The object could be for example a vision device worn on the face, such as a pair of glasses or a portable device worn on the head comprising a frame and a display screen, such as a virtual reality, mixed reality or augmented reality helmet. The object could also be any other accessory worn on the head of an individual such as a scarf, hat, makeup, jewelry or hairstyle.

The image is acquired through an image capture device which can be a camera, photographic apparatus or a depth camera. The depth camera, well known by those skilled in the art, combines a camera and an infrared distance measuring of elements in relation to the subject. The image may be a single image or included in a sequence of images, also called a video.

According to the invention, the image generation method comprises the following steps:
  a) detection of the presence of said object in the initial image;
  b) superposition of a first layer on the initial image, the first layer including a mask at least partially covering the object in the initial image;
  c) modification of the appearance of at least one part of the mask.

Thus, the method permits the modification of the visual aspect of the detected object by covering it with a mask whose aspect is modified. The mask is comprised of pixels covering a continuous or non-continuous area in the initial image. The mask may cover the entirety or a portion of the object. In the example of a pair of glasses, the mask may solely cover the frame of the pair of glasses, the frame and a part of the lenses, the frame and the lenses entirely, or only the lenses. It should be emphasized that the shadows of the glasses can also be covered by the mask.

The modification of the appearance of the mask corresponds to a modification of the color and/or of the opacity of a part or the entirety of the pixels of the mask.

In a particular embodiment of the invention, the modification of the appearance of the mask comprises a step of substitution of the texture of all or part of the object in the final image.

Thus, it is possible for a user to wear a pair of glasses of a certain color and to view himself with the same pair of glasses in another color. The texture of the object is one representation of the external aspect of the object. The texture may be for example be connected to the color of the object, to its composition, such as the presence of various layers of porous or translucent materials. The texture may also be connected to the type of finish of the object, such as for example the presence of a layer of gloss or matte varnish.

In a particular implementation of the invention, the modification of the appearance of the mask comprises a step of determining the texture of all or part of the object, the texture replicating background elements of the object in order to suppress all or part of the object in the final image.

Thus, the object detected in the initial image is automatically suppressed in the final image. In other words, the method for generating a final image from an initial image is a method of suppression of an object in an image.

In a particular implementation of the invention, the mask also covers all or part of a shadow cast by the object.

Thus, the modification of the appearance of the mask also allows for the shadows cast by the object to be rendered invisible. For example, the shadow that the pair of glasses casts on the face of an individual wearing said glasses may also be erased from the face, augmenting thus the realism of the suppression of the pair of glasses.

In a particular embodiment of the invention, the image generation method also comprises the following step:

d) superposition of a second layer on the initial image over the first layer, the second layer comprising least of an element partially covering the mask.

Thus, the elements comprised in the second layer are, for example, hair covering one side of a pair of glasses or a hand placed in front of part of the object. The superposition of the various layers allows the conservation of the realism of the final image.

In a particular embodiment of the invention, the image generation method also comprises prior to step b), the following steps:

determination of the orientation of the object relative to a capture device acquiring the initial image;

determination of a characteristic dimension of the object in the initial image.

The capture device for the initial image comprises a photographic sensor and a photographic lens enabling the converging of real images onto the sensitive surface of the photographic sensor. The camera comprises at least one convergent lens. The image capture device can be for example a camera, a photographic apparatus or a webcam.

The orientation of the object relative to the image capture device corresponds to the angle formed by the object in a reference frame of the capture device. This reference frame may be for example an orthonormal frame where one axis coincides with the optical axis of the object. In other words, the object whose orientation is determined, is followed over a sequence of images. The characteristic dimension of the object may be for example the width of the frame of a pair of glasses.

In a particular implementation of the invention, the image generation method also comprises prior to step b), the following steps:

development of a three-dimensional model of the object;

development of the mask by geometric projection of the three-dimensional model on the first layer, the model having on the first layer the same orientation and the same characteristic dimension as the object.

Thus, the model representing the object is virtually superimposed on the object.

It should be emphasized that the model of the object may contain distorted and flattened two-dimensional images according to the orientation and the dimension of the real object. The model of the object may also be three-dimensional with or without thickness. The orientation and the characteristic dimension of the model correspond to the parameters of similarity between the model of the object and the real object. The projection of the three-dimensional model provides the mask. The mask may cover the entirety or one part of the result of the projection of the model on the layer. It is emphasized that the mask may also cover an area of the image wider than the projection.

In a particular embodiment of the invention, the development of the model of the object is performed based on at least one image of the object alone.

The generation of the model of the object may be for example performed in a device dedicated to the modeling, comprising a box in which the object is housed, with one or more image capture devices focused on the object. One image may suffice for the development of the model of the object, provided that this is a view of three quarters of an object presenting a plane of symmetry, such as for example a pair of glasses. More generally, the development of a model of the object is performed based on at least two images of the object, where the images present the objet under two different angles.

In a particular implementation of the invention, the object is worn on the face of an individual.

In a particular embodiment of the invention, the development of the model of the object is done using at least one image of the object worn on the face of the individual.

Thus, the individual may keep the object on his face during the generation of the model.

In a particular embodiment of the invention, the object comprises a frame extending to either side of the face, and at least one lens assembled to said frame.

Thus, the object may be a vision device such as for example a pair of glasses.

In a particular embodiment of the invention, the image generation method also comprises a step of identifying the frame from frames previously modeled, the mask being developed based on the model of the identified frame.

Thus, the projection on the first layer of the model of the frame identified and previously modeled allows the generation of a realistic mask of the frame. It should be emphasized that the mask may comprise all or part of the projection of the frame on the first layer. An area of the image corresponding to a lens assembled in the frame, or to a cast shadow, may also be added to the mask. It should also be emphasized that a database can store the models of frames and that the identification of the frame is performed amongst the frames stored in the database.

The identification may be made automatically by the method or manually by an individual. Manual identification may be made for example through information inscribed by the manufacturer on the interior of the frame of the pair of glasses.

In a particular embodiment of the invention, the identification of the frame is performed by generating support curves adjusted to the contours of the frame.

In a particular embodiment of the invention, the identification of the frame is based on at least one of the following criteria:
shape of the frame;
colour(s) of the frame;
texture(s) of the frame;
logo presented on the frame.

In a particular embodiment of the invention, the image generation method also comprises a step of development of a representation of the environment of the object.

The environment comprises all of the elements surrounding the objet in the image, as well as the elements in the background of the object in the image. The representation may be in the form of an image and/or of a three-dimensional model. For example, in the case of a pair of glasses worn on a face, the representation of the environment may comprise a model of the face on which the pair of glasses is worn and/or an image corresponding to the background of the face.

In a particular embodiment of the invention, the step of modification of the appearance of the mask comprises the following sub-steps:
geometric projection of the representation of the environment upon which an intermediate layer is superimposed on the first layer;
determination of the new color of a pixel of the mask according to the color of at least one pixel of the intermediate layer near the pixel of the mask.

Thus, the modification of the appearance of the mask allows the suppression of the object in the final image. The geometric projection of the representation of the environment on the intermediate layer allows the generation of an image on which the mask of the object is superimposed. In the case of a representation comprising a background image and a three-dimensional model, the geometric projection of the three-dimensional model on the intermediate layer produces an image superimposed over the background image. The intermediate layer thus presents a two-dimensional representation of the environment on which the mask of the object is superimposed.

In a particular embodiment of the invention, the image generation method also comprises a step of detection of the presence of a face in the environment and in which the representation of the environment comprises a model of the detected face on which a texture of the face is applied.

The texture of the face is an image in two dimensions which is being applied to the model. It should be emphasized that the model and the texture may be advantageously realistic. The detection of the presence of the face may be made by detecting the characteristic points of the face, such as for example the edge of the temples, the tip of the nose or chin, or the corners of the eyes.

In a particular embodiment of the invention, the image generation method also comprises a step of determination of the orientation of the face relative to the capture device and in which the model of the face is essentially positioned according to the orientation previously determined.

Thus, the three-dimensional model representing the face is oriented in a realistic manner in the virtual space corresponding to the scene acquired by the image.

In a particular embodiment of the invention, the mask covering at least part of the object worn on the face is developed based on the geometric projection of the model of the face on the first layer.

Thus, the suppression of the object worn on the face is realized thanks to a mask developed based on a projection of the model of the face and not to a mask based on a projection of the model of the object. It should be emphasized that this particular embodiment of the invention eliminates the need for tracking of the object. Furthermore, the developed mask may not take into consideration the dimension of the object, in which case the dimension of the mask is developed according to the dimension of the face. In the case of a pair of glasses worn on the face, the dimension of the mask is advantageously sufficient to cover the majority of the models of the existing pairs of glasses.

In a particular embodiment of the invention, the image generation method also comprises the steps of:
estimating a colorimetric transformation from the initial image of at least one pixel of the model of the face;
converting the color(s) of all or part of the model of the face.

Thus, the model of the face is illuminated in a realistic manner relative to the actual scene. The estimation of the colorimetric transformation can be made by an analysis of at least one light source lighting the face of the individual.

In a particular embodiment of the invention, the color of a pixel on the texture of the face is determined through an inpainting method based on the colors of a patch near the pixel.

The patch corresponds to a number of pixels forming a continuous region. The shape of the patch may be square or rectangular, each side generally comprising between one and five pixels. A patch of circular shape may be obtained by inserting a Gaussian filter inside a square patch. The inpainting method, well known by those skilled in the art, allows for the completion of the texture of the face, particularly in the case of the generation of the model of the face of an individual wearing a pair of glasses. Indeed, in this example, even if the frame or lenses conceal a part of the face.

In a particular implementation of the invention, the position of the patch is essentially located on the perpendicular relative to the contour of the area comprising the missing pixels.

Thus, if one part of the face is hidden, the color of a missing pixel in the texture of the face is generated based on a patch near the missing pixel, the patch being located on the perpendicular to the contour of the obscured area of the face.

In a particular implementation of the invention, the position of the patch is essentially located on the vertical of said pixel.

Thus, the inpainting method respects the general shape of a face which includes on either side a vertical area of hair that covers parts of the temples.

In a particular embodiment of the invention, the color of a pixel on the texture of the face is determined through an inpainting method based on the model of the face, previously established and oriented, the model of the face including a representation of the eyes.

In a particular embodiment of the invention, the method of generation of an image also comprises a step of identification of at least one ocular region on the texture of the face, the ocular region corresponds to the position of one eye of the detected face.

The identification of one ocular region on the texture of the face may be performed by identifying the position of characteristic points of one eye such as for example the precise exterior and interior corners of an eye.

In a particular implementation of the invention, the filling of the ocular region is made through knowledge of the topology of the eye of the detected face.

The topology of the eye comprises a parametric representation via curves, the various regions of the eye, including the iris and eyelids.

Thus, the filling of the ocular region is more realistic as it respects the position of the iris and the pupil. The filling of the iris may be made via an inpainting method recovering a nearby pixel in a corresponding area of the iris. In the case where the corresponding area of the iris covers empty pixels or pixels with no coherent values, the iris is recreated according to a default iris topology by taking into consideration possibly the color of the iris of the other detected eye.

In a particular embodiment of the invention, the development of the representation of the environment of the object worn on the face of an individual is performed without detecting the face in the environment.

Thus, the method is used without detecting or monitoring the face of an individual.

In a particular embodiment of the invention, the development of the representation of the environment comprises a sub-step of correction of the optical distortion caused by a transparent element positioned between the environment and a capture device acquiring the initial image.

Thus, the geometric distortions in the image of the face or of the background caused for example by the reflection of a corrective lens of a pair of glasses positioned on the face of an individual are corrected.

In a particular embodiment of the invention, the image generation method is applied to all or part of a sequence of images forming a video.

It should be emphasized that the video may be in the form of a recording or of a stream in real time, such as for example a streaming video broadcast, a technique well known by itself. The video may also be a real time stream from a camera and instantaneously visible on a screen.

In a particular implementation of the invention, the representation of the environment and/or the model of the object are updated for each image of the sequence.

Thus, the representation and/or the model updated based on multiple images of the sequence are increasingly representative of the reality. An area hidden by the object, such as for example the part of the face located behind a pair of glasses, may thus be updated in the representation of the environment including a model of the face, when the individual turns the head. Indeed, in turning the head, the capture device for the initial image takes images of the face under new viewing angles, which improves recognition of the face.

In a particular embodiment of the invention, the representation of the environment and/or the model of the object are updated based on a multitude of initial images acquired according to multiple distinct viewing angles.

The initial images taken according to multiple distinct viewing angles can be acquired with one or multiple image acquisition devices focused according to distinct angles.

In a particular embodiment of the invention, the generation of the final image is performed in real time from the initial image.

Thus, the processing of the captured image is made in a short and guaranteed time. The processing time of a captured image of the individual specifically allows the display of the processed image of the individual with no visible lag for the individual. The processing time is less than $\frac{1}{10}^{th}$ of a second. The processing time is preferably but not necessarily less than the display time between two images, which is generally equal to $\frac{1}{25}^{th}$ of a second. In other words, the processing in real time allows the display of a video stream from a camera instantaneously on a screen, the images of this stream having already undergone a processing in a time sufficiently short enough so as to not be perceived by the human eye.

The invention also concerns a method of augmented reality intended to be used by an individual wearing a portable device on the face, including the following steps:
  acquisition in real time of a video of the individual wearing the portable device on the face;
  display in real time of the video in which the appearance of the portable device is entirely or partially modified by the image generation method.

Thus, through the image generation method, the individual may see himself directly on a screen without the portable device worn on his face. The portable device comprises generally a frame adapted to be worn on a head. It can also comprise at least one lens and/or a display. In the case of a portable device with only a frame, the frame can be advantageously configured to avoid covering the eyes and the eyebrows. It should be emphasized that the portable device can be a vision device. This method of augmented reality particularly allows an individual wearing a pair of corrective glasses to see himself on the screen with the same pair of glasses but with a different color and/or texture.

Advantageously, the portable device is entirely or partially suppressed in the video displayed in real time.

Thus, the individual wearing a pair of corrective glasses can see himself on the screen without his pair of glasses.

In a particular embodiment of the invention, the vision portable device worn by the individual comprises a frame and corrective lenses adapted to the vision of the individual.

In a particular embodiment of the invention, the individual wearing the portable device tries on a virtual object superimposed at least partially in the video on the vision device partially or totally suppressed.

Thus, a user wearing a pair of corrective glasses may virtually try on a new pair of glasses all while retaining his pair of corrective glasses enabling him to maintain his visual comfort.

In a particular embodiment of the invention, the method of augmented reality comprises a step of initialization of the model of the face of the individual based on at least an image of the individual not wearing the portable device on the face.

Thus, the individual previously removes his vision device from his face for the generation of the model of the face, and returns it at the end of the specified time. The acquisition of the image of the individual may be made via one or multiple image capture devices. The individual may make movements of his head so that the generation of the model of the face is made based on multiple images of the face captured under various viewing angles.

In a particular embodiment of the invention, the method of augmented reality comprises a step of initialization of the model of the face of the individual based on multiple images of the individual wearing the portable device, the images corresponding to the various viewing angle of the face.

Thus, the generation of the model of the face is performed without needing to remove the vision device from the face of the user.

In a particular implementation of the invention, the method of augmented reality comprises a step of initialization of the model of the portable device based on at least one image of said device captured in a dedicated modeling device.

In another particular embodiment of the invention, the method of augmented reality comprises a step of initialization of the model of the portable device based on at least one image of the individual wearing the portable device.

The invention also concerns an augmented reality device enabling the trying on of a virtual object by an individual wearing a portable device, the virtual object at least partially covering the portable device, the try on device comprising:

at least one camera capturing a video of the individual;

a processing unit for the captured video, the processing unit suppressing at least partially in the majority or all of the images of the video the vision device through the image generation method;

at least a screen displaying the processed video of the individual.

In a particular embodiment of the invention, the screen is vertical and the camera is positioned accordingly in the plane of the screen.

Thus, this particular configuration enables an individual sitting or standing facing the camera to view himself live, such as in a mirror.

In a particular embodiment of the invention, the device for trying on the virtual object comprises two cameras spaced apart, parallel to an edge of the screen, at a distance comprised between thirty and fifty centimeters.

Thus, the individual is generally placed at a distance comprised between twenty-five centimeters and one meter from the screen in order to be able to touch the screen, the distance between the cameras is optimal for obtaining two shots of the face enabling to reconstruct the model and the texture of the face in a realistic manner.

In a particular embodiment of the invention, the device for trying on a virtual object additionally comprises a third camera essentially placed on the median axis between the two first cameras.

Thus, the third camera allows to obtain a frontal image of the individual, this image is displayed on the screen. The two first cameras enable improving the realistic modeling of the face and of the pair of glasses worn by the user.

In a particular embodiment of the invention, the screen is touch-sensitive.

Thus, the user may select the virtual object to try on. The virtual object may be a vision device such as a pair of vision glasses or sunglasses, an accessory for the face or makeup.

In a particular embodiment of the invention, the display of the captured and modified video is made in real time.

In other words, the device is an augmented reality device where the user can try on a virtual object and see himself in real time on the screen.

In a particular embodiment of the invention, the device for trying on a virtual object comprises a capture device of a three-dimensional model of the vision device.

BRIEF DESCRIPTION OF THE FIGURES

Other advantages, aims and special features of the present invention will emerge from the following non-limiting description of at least a particular embodiment of the methods and devices that are the subject of the present invention, with reference to the accompanying drawings, in which.

Figure 2:
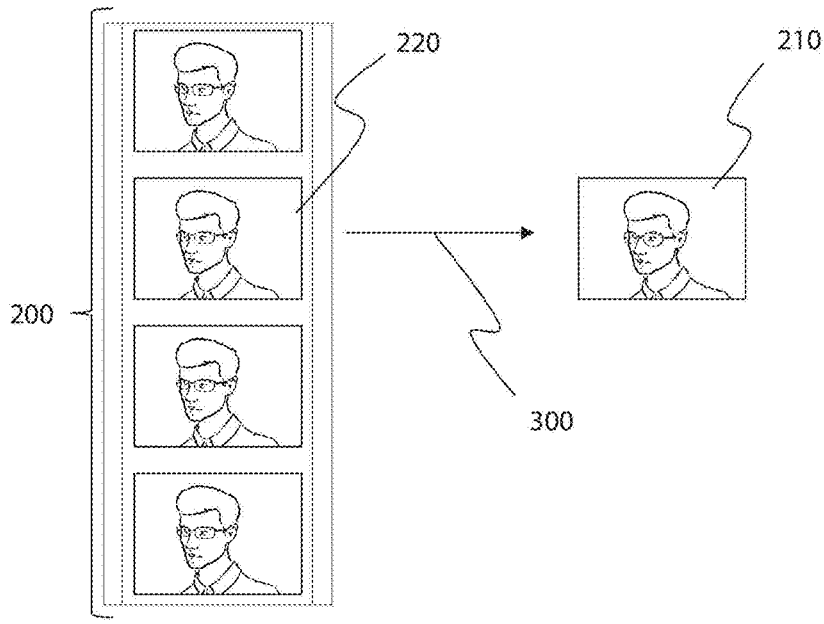
FIG. 2 represents a block diagram of an embodiment of the generation method of a final image based on an initial image.
Figure 5:
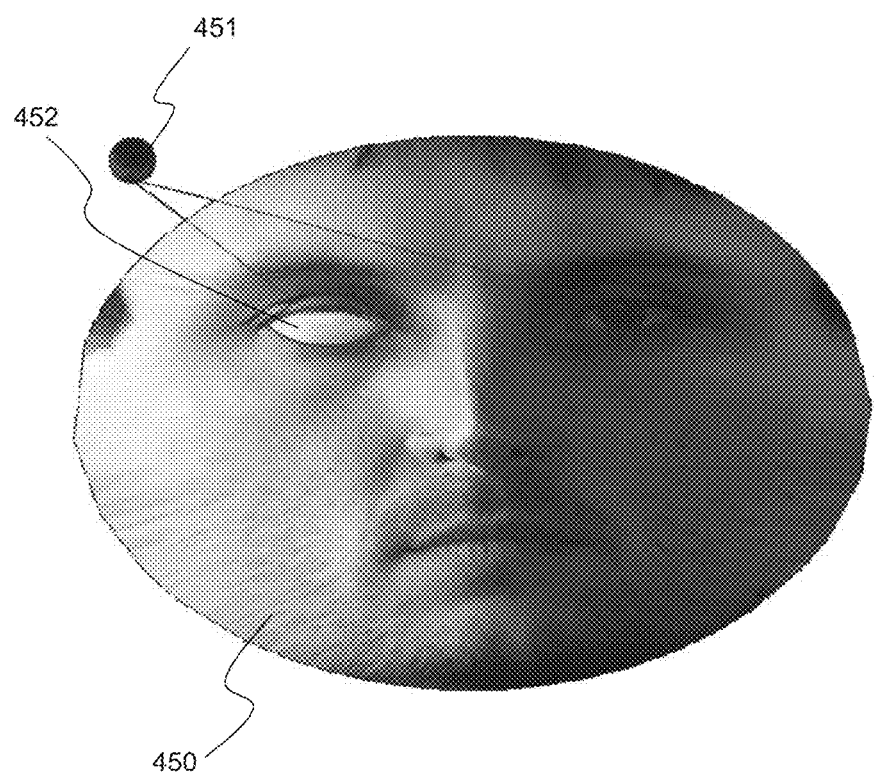
Figure 7:
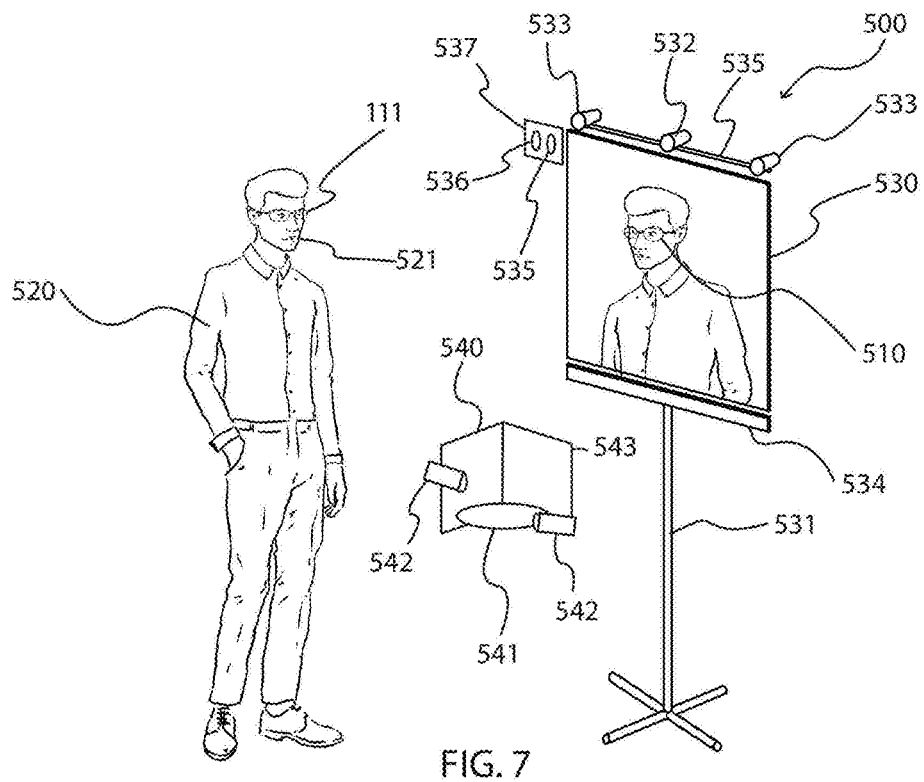
Figure 8:
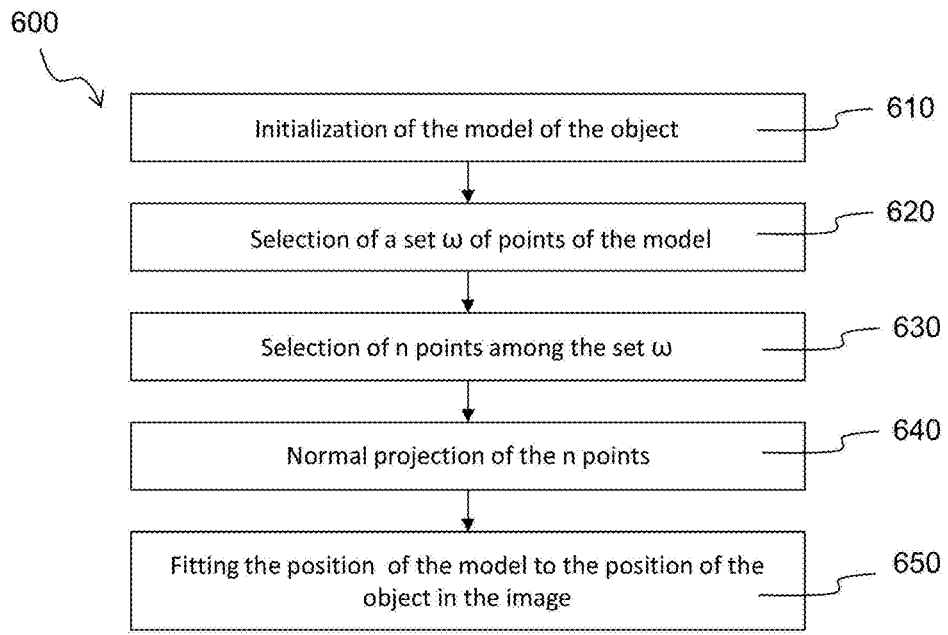
Figure 9:
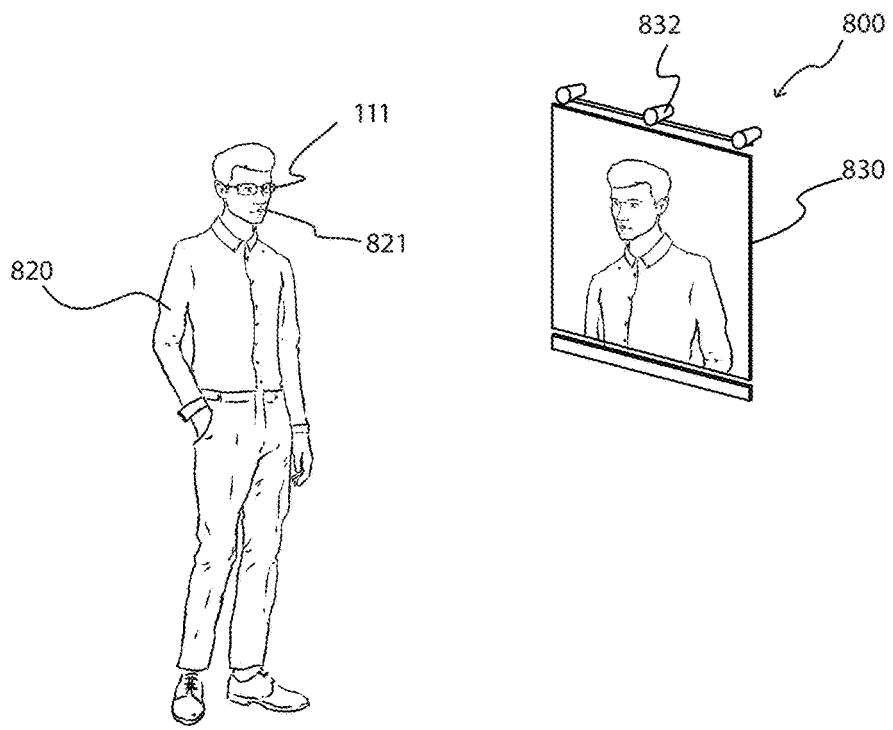
Figure 10:
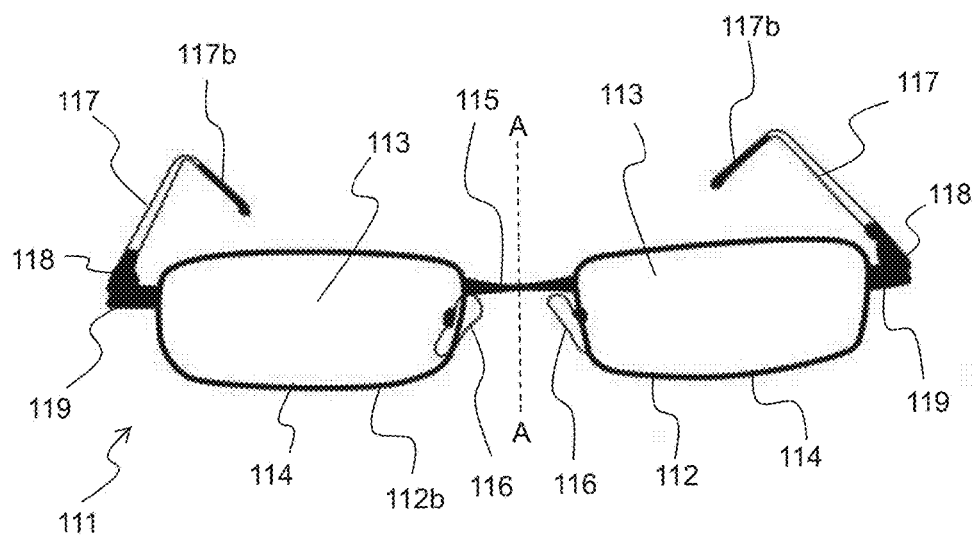
Figure 11:
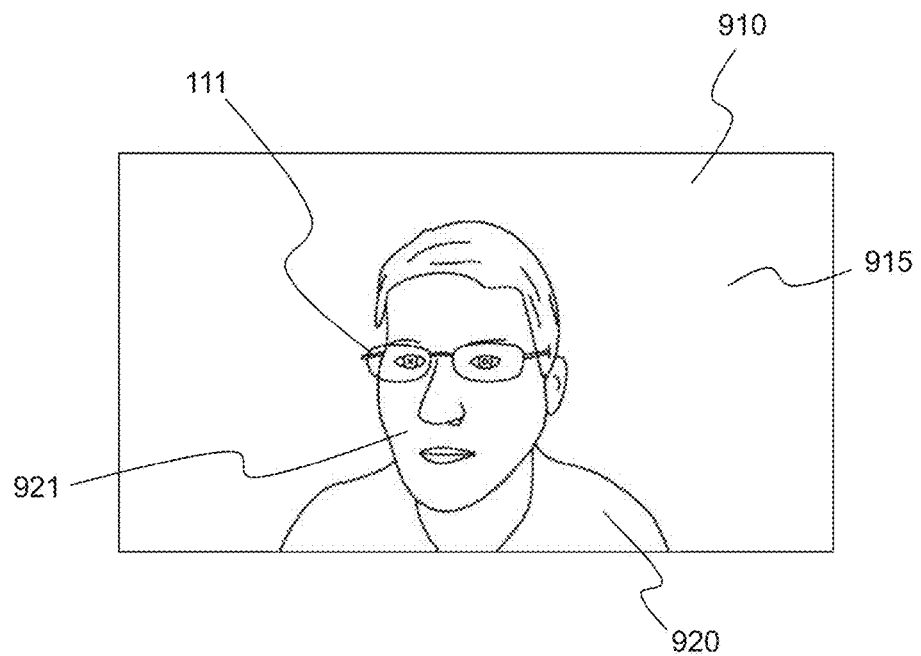
Figure 12:
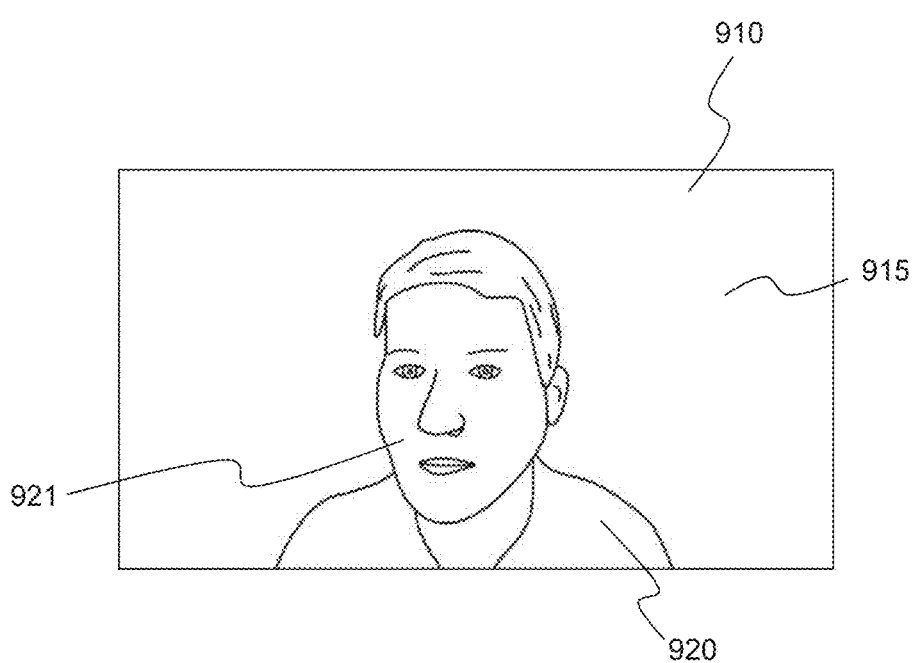

4*a*: a perspective view of the model of the eyes;

4*b*: a side view of a model of the ocular globe;

4*c* a frontal view of a model of the eye;

4*d* a side view of a model of the ocular globe including the curves of the eyelids;

4*e* a frontal view of a model of the eye illustrating the motion of the iris;

FIG. 5 illustrates an example of texture captured from a real face;

FIG. 6, 6A-E illustrate the masks generated during the image generation method referenced in FIG. 2;

FIG. 7 represents another embodiment of the augmented reality device enabling the trying on of a virtual object by an individual wearing a real vision device;

FIG. 8 represents in the form of a schematic diagram another embodiment of the generation method of a final image based on an initial image FIG. 9 represents another embodiment of the augmented reality device used by an individual wearing a real vision device;

FIG. 10 represents a pair of glasses used in the examples of the embodiments of the invention;

FIG. 11 represents a screen displaying a video of an individual wearing a pair of glasses on the face;

FIG. 12 represents a screen displaying the video referenced in FIG. 11 in which the pair of glasses is suppressed.

DETAILED DESCRIPTION OF THE EMBODIMENTS OF THE INVENTION

The present description is given without limitation; each characteristic of an embodiment may be combined with any other characteristic of any other embodiment in an advantageous manner.

We note that the figures are not to scale.

Preliminary Description of the Examples of Embodiment of the Invention

FIG. 10 represents a pair of glasses 111 including a rigid frame 112 and two corrective lenses 113 assembled in frame 112. Frame 112 is symmetric relative to the median plane AA comprising a face 112*b* and two temples 117 extending laterally on either side of the face 112*b*.

Face 112*b* comprises two rims 114 encircling lenses 113, a bridge 115 ensuring the spacing between rims 114 as well as two pins 119. Two pads 116 each attached to rim 114 intended to stand on either side of a nose of an individual.

The two temples 117 each attached to a pin 119 of face 112*b* through hinges 118 enabling thus frame 111 to be hinged. In the open position of frame 112, face 112*b* is inclined at an angle comprised between 5° and 10° relative to the perpendicular plane of the plane formed by the axes of temples 117. This angle essentially merges with the pantoscopic angle of the pair of glasses 111, that is to say with the angle of face 112*b* with the vertical while the pair of glasses 111 is placed on the nose of an individual looking away without tilting the head, the plane of the temples 117 being horizontal. Each temple 117 ends with a temple tip 117*b* intended to stand on an ear of an individual. Frame 112 extends thus laterally to either side of the face of an individual wearing the pair of glasses 111.

It should be emphasized that pair of glasses 111 used in the following two examples of embodiment of the invention, is a non restrictive example of the real object suppressed in an image or a sequence of images by the method subject of the invention.

Example of a Particular Embodiment of the Invention

Figure 1:
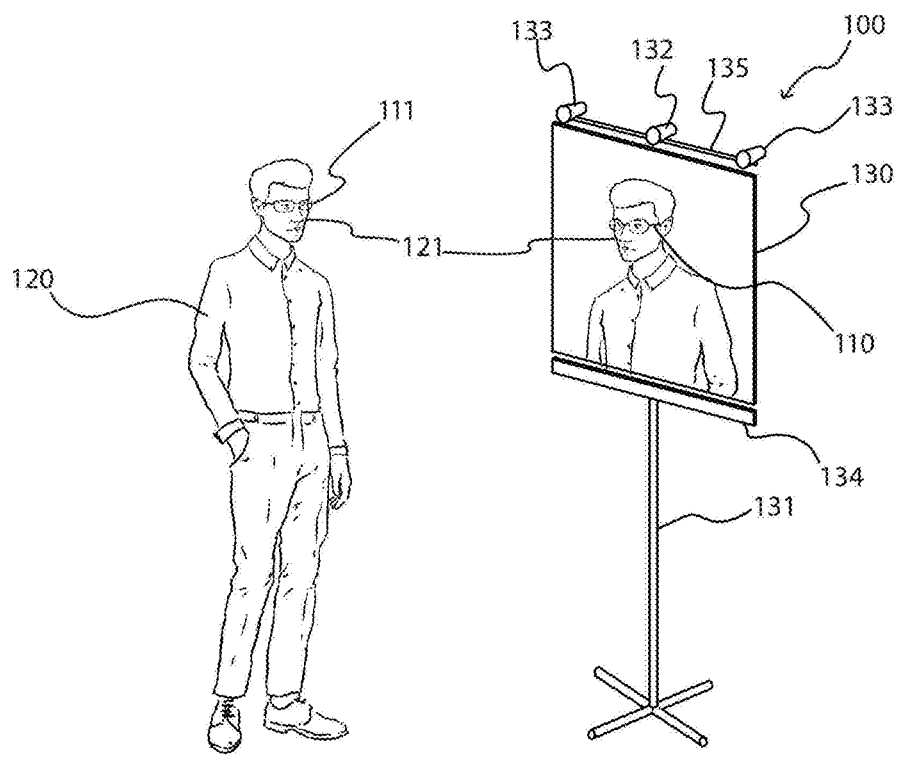
FIG. 1 represents an embodiment of an augmented reality device enabling the trying on of a virtual object by an individual wearing a real vision device.

FIG. 1 represents a device 100 for trying on of a virtual object 110 by an individual 120 wearing the pair of glasses 111 on the face.

It should be emphasized that in the present non restrictive example of the invention, the individual 120 is moderately myopic. Thus, the visibility for the individual 120 not wearing any pair of corrective glasses is approximately twenty centimeters.

The device 100 comprises a touch screen 130 fixed vertically on a support 131, a camera 132 centered above the screen 130, two peripheral cameras 133 and a processing unit 134.

In a variation of this embodiment, the device 100 comprises in addition a depth sensor measuring via infrared the distance of the elements relative to the camera. The depth sensor may comprise an infrared projector and a light sensor in the infrared wavelength. The light sensor is in the immediate proximity of the projector, the density of the points of the image allowing to infer a depth map indicating the distance of each point of the image relative to the sensor.

In another variation of this particular embodiment of the invention, device 100 comprises also a scanner or a double sensor allowing the acquisition of a model of the entirety of the face of the individual 120.

While the individual 120 is facing the screen 130, the individual 120 sees the image of his face 121 from the front, captured in real time by the camera 132.

In order to be able to touch the touch screen 130, the individual 120 stands within arm's length distance of the screen 130. The distance between the individual 120 and the touch screen 130 is included between sixty and one hundred twenty centimeters. The individual 120 wears the pair of glasses 111 in order to see the screen 130 clearly.

The two peripheral cameras 133 are fixed on a parallel track 135 along the upper edge of the screen 130, symmetrically on either side of the camera 132. The distance between the two peripheral cameras 133 is included between thirty and fifty centimeters. In the present example, the space between the two cameras 133 is equal to forty centimeters, which allows the acquisition of images of the face 121 of the individual 120 with a viewing angle offset approximately 20 degrees from the normal.

The processing unit 134 generates based on each initial image of the sequence captured by the camera 132 a final image of the face 121 of the individual 120 in which the pair of glasses 111 is suppressed. In other words, the pair of glasses 111 is rendered invisible on the display in real time of the face 121 on the screen 130.

For this purpose, a virtual representation of the scene acquired by the camera 132 is created. This virtual representation comprises a three-dimensional model of the pair of glasses 111 positioned on a representation of the environment including a model of the face of the individual 120. The projection of the model of the pair of glasses 111 and of the representation of the environment allows the creation of a mask superimposed on the real pair of glasses in each image of the sequence acquired by the camera 132.

It should be noted that for the virtual representation, a virtual camera replaces camera 132 having the same angle and the same magnification. In other words, the optical characteristics of the virtual camera are identical to those of camera 132.

As is illustrated in FIG. 2, the processing unit 134 generates thus a new image 210 based on each image 220 of the sequence 200 acquired by the camera 132 according to an image generation method 300.

Figure 3:
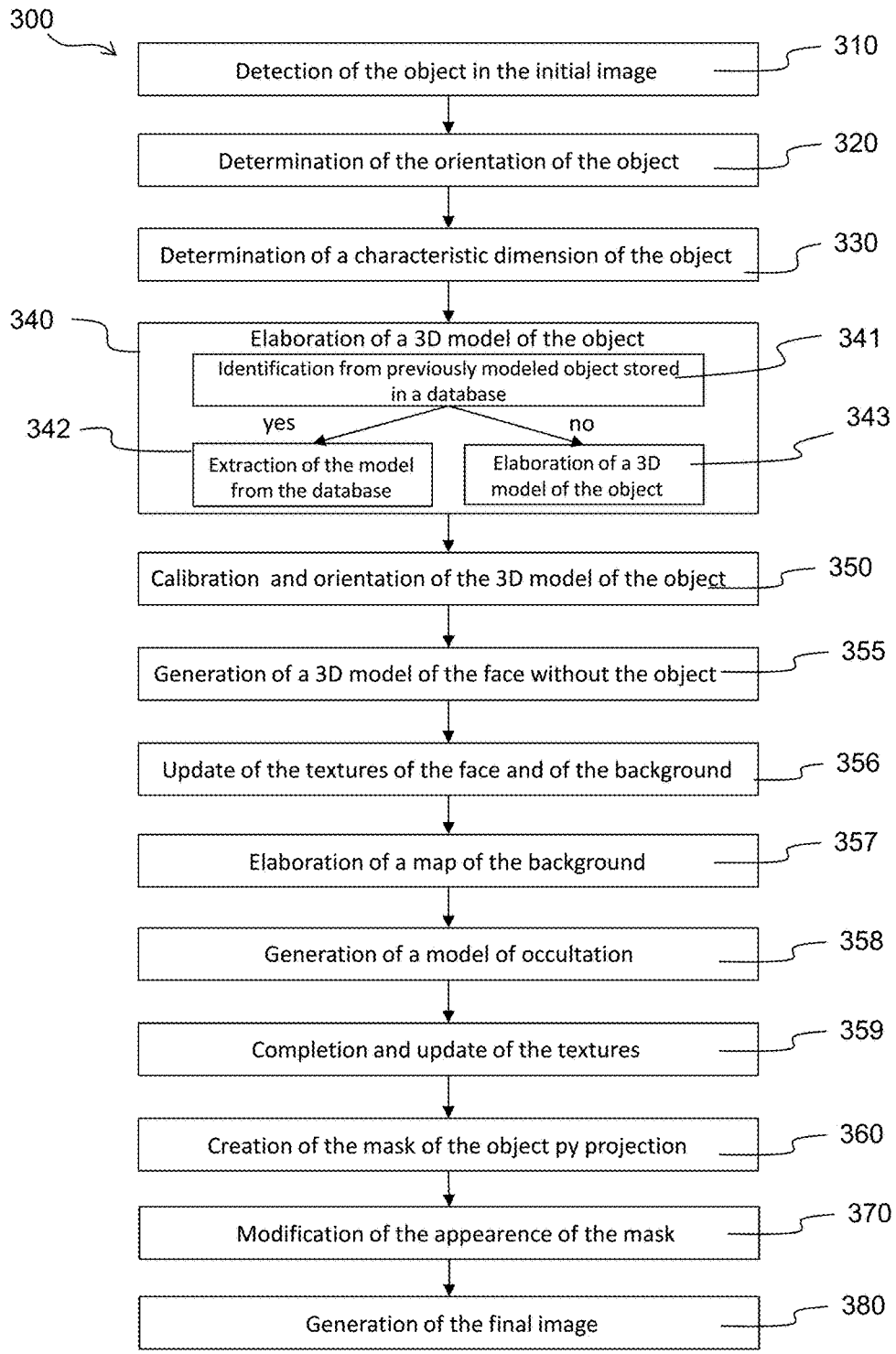
FIG. 3 represents in the form of a schematic diagram the steps of the image generation method referenced in FIG. 2.

FIG. 3 represents in the form of a schematic diagram of the generation method 300.

In a first step 310, the generation method 300 detects the presence of the pair of glasses 111 in the initial image 220.

The generation method 300 determines in a second step 320 the orientation of the pair of glasses 111 relative to camera 132.

The generation method 300 determines in step 330 a characteristic dimension of the pair of glasses 111 in the initial image 220.

The characteristic dimension is in the present non restrictive example of the invention, equal to the width of frame 112.

The generation method 300 elaborates in step 340 a three-dimensional model of the pair of glasses 111 in a virtual space representing the real space captured by camera 132.

Step 340 of development of the model of the pair of glasses 111 comprises a first sub-step 341 of identification of the pair of glasses 111 from the pairs of glasses previously modeled and stored in a database linked to the processing unit 134. This identification may be made by knowledge of the reference of the glasses and the elements called frame marking printed on the latter.

The identification of the pair of glasses 111 may also be made by automatic recognition based on images of the pair of glasses worn by the user or in a device dedicated to the image capture of the pair of glasses alone, such as for example a light box. For this purpose, the automatic identification used in methods of indexing and visual recognition of appearance of 3D objects well known by those skilled in the art, by generating for example support curves fit to the contours of the pair of glasses 111.

It should be emphasized that the visual recognition of the pair of glasses may be made based on the criteria of:
- shape of the pair of glasses;
- color(s) of the pair of glasses;
- texture of the pair of glasses;
- presence of a notable characteristic on the pair of glasses or a logo.

In the case where sub-step 341 results in a positive result where a pair of glasses is identified, the model of the pair of glasses 111 is extracted from the database through a sub-step 342.

In the opposing case where the pair of glasses 111 does not match any pair of glasses of the database, the 3D model of the pair of glasses 111 is elaborated, during sub-step 343, based on images from sequence 200 captured by camera 132, and eventually based on parameters representing the closest model in shape determined during the step of searching in the database.

It should be emphasized that the images of sequence 200 present the individual 120 wearing the pair of glasses 111 on the face. The development of the model of the pair of glasses 111 is thus performed in real time based on images captured by the central camera 132 and by peripheral cameras 133. When the head of the individual 120 is inclined and/or turned, the cameras capture images from a new viewing angle. The model of the pair of glasses 111 is updated in each image, particularly when the image presents a view of the individual 120 from a different angle.

The model of pair of glasses 111 created during sub-step 343 is constructed by forming in a first step a model in the shape of face 112*b* of the pair of glasses 111 and a model of temples 117 of the pair of glasses 111. It should be emphasized that in the case where the pair of glasses is not symmetrical, a model for each temple is created.

In a variation of this particular embodiment of the invention, the model in the shape of face 112b also including the pads 116.

In order to create the model of face 112b of the pair of glasses 111 and the model of the temples 117, a skeleton of the pair of glasses is used. The skeleton is extracted from a database grouping types of topologies of pairs of glasses. The types of topologies of pairs of glasses enable the classification of pairs of glasses according to shapes of the glasses. The topologies are defined by:
- a type of rim: full rim, upper half-rim, lower half-rim, absence of a rim;
- a shape of rim: round, oval, rectangular;
- shape of pins;
- a bridge or bar connecting the two lenses, the temple and/or a bar which can be single or multiple;
- two temples;
- the recognition of distinguishing features of each of the above elements, such as for example the presence of a hole in a temple, a dissymmetry between the rims, an extension on the frame . . . .

The thickness is determined around the skeleton of the pair of glasses by generating a closed 3D envelope which encircles the pair of glasses 111.

The generation of the 3D envelope is performed in the three following sub-steps:
- creation of support curves in the perpendicular planes of the skeleton. These support curves correspond to sections of frame 112;
- generation of a 3D envelope in contact with the support curves;
- creation of a grid in the interior of the 3D envelope.

It should be emphasized that support curves enabling the generation of the 3D envelope are created from prior knowledge, designed manually or statistically calculated. The initialization of support curves is generally made during the step of visual recognition attempting to automatically identify the pair of glasses 111. Support curves are generated based on the images of the pair of glasses 111 worn on the face or based on images of the pair of glasses 111 captured on a neutral background by a dedicated modeling device (not represented in FIG. 1).

After the generation of the model of the pair of glasses 111 based on the images of the individual 120 wearing the pair of glasses 111 on the face, the model of the pair of glasses 111 is then recalibrated in an identical manner to the real pair of glasses 111, during step 350. The model of the pair of glasses 111 has thus the same orientation relative to the camera 132 and the same characteristic dimension in the image as the real pair of glasses 111.

In other words, the model of the pair of glasses 111 is positioned in the virtual space, oriented according to the position of the virtual camera and configured according to the dimension of the real pair of glasses 111. A magnification factor may thus be applied to the model of the pair of glasses 111. The parameters of the pose of the model of the pair of glasses 111 are notated as $Pe_{Mg}$.

During step 355, the generation method creates a geometric model $M_a$ in three dimensions of an avatar representing the face without the pair of glasses 111. A texture $T_{aNG}$ of the face without the pair of glasses 111 is also created during step 355. The geometric model $M_a$ is configured in morphology and expression according to the method of development of the model of the face described below.

The method of development of the avatar comprises a first step of detection of the face in the image and facial analysis of the detected face. The detection of the face is performed in the present non limited example of the invention by a Viola-Jones method, such as is explained in patent FR2955409.

A feature alignment algorithm is used to discover the features specific to the face, during a second sub-step of the method of development of the face. For this purpose, a feature detection mechanism well known by those skilled in the art is used and allows the discovery in a very reliable manner of the internal features of the face.

The HPAAM feature alignment algorithm, described in European patent application EP2678804, then allows the precise location of the projection of the significant 3D features in the image. Contrary to existing techniques which give rise to location error in congested environments, HPAAM is particularly stable on features located on the contour of the face, such as the tips of the ears. Given that the HPAAM algorithm is a technique used in a knowledge building phase, the use of predetermined points offering a 3D match has an impact on the success of the technique of global facial analysis, particularly as concerns the robustness and efficacy of the technique. Generally, this relation is specified for a small number of points in the 3D facial analysis techniques, such as the starting points of a 3DMM adjustment strategy, in which five points are defined manually.

It should be emphasized that this step of detection of the face is robust to occlusions of the face formed by the pair of glasses 111.

The second step of the method of development of the avatar concerns the estimation of the parameters of the model of the face $\theta_{model}$ including:
- the extrinsic parameters $Pe_{Ma}$ of the model of the face, that is to say the parameters of the pose of the face, which is the position and the orientation of the face;
- the intrinsic parameters $Pi_{ma}$ of the face, that is to say the 3D morphology of the face; and eventually
- the models of expression of the face, the extrinsic parameters (translation $T_{SE}$) and the parameters of the configuration of the eyes, which are reestimated at each image during tracking.

The parameters of the model of the face $\theta_{model}$ are estimated using a statistic geometric model of the morphology of the human face. For this purpose, a database of the faces is used, such as for example the database described in the paper by Blanz and Vetter published in 2003, with the title "Face Recognition Based on Fitting a 3D Morphable Model".

One estimation of the parameters of the model of the face $\theta_{model}$ and of the parameters $\theta_{cam}$ of the virtual camera is performed by using the features found in the feature detection phase and by dynamically adjusting the contours in the image.

In order to estimate the intrinsic and extrinsic parameters $\theta_{cam}$ of the camera and the parameters of the model of the face $\theta_{model}$, a minimization of both the distance between the features of the face found in the image $f_{i,j=1\ldots n}$ and the projection of the 3D semantic point defined on the face parametric $Proj_{(Xs(i))}$, and of the distance between the projection of the parametric contours of the face and the related edges of the image is made.

The function Proj(X) represents the projective transformation of a 3D scene, such as for example the face or the pair of glasses, into a layer or an image plane, by considering a pinhole type camera model, well known by those skilled in the art, which enables the creation of a perspective division. Thus, the function Proj(X) allows switching between 3D point X=(x, y, z) to the Euclidean space of the scene at point (u,v) of the layer, by taking into account the intrinsic parameters of the camera contained in the K matrix and the rigid transformation of the shape RX+T, with R rotation matrix 3×3 and T translation 3×1. When necessary, this projection is noted as Proj(X; K, R, T).

It should be emphasized that the projection of the parametric contours of the face corresponds to the projection of the points of the model of the face where the norm is orthogonal in their direction of observation.

For this purpose, a sampling of the orthogonal direction of the contours at the current sample point is made and allows sampling of the contours for multiple raisons: numeric efficacy stability and compatibility with other alignment techniques used in the tracking of 3D objects. For this purpose, for each iteration of the minimization, a calculation $C(\theta_{cam}, \theta_{model})$ which contains a subset of points of the model of the face $X_j$ with the default $n_j$ orthogonal at the axial projection and the points related to the contour of the image contj=ProjContour($X_j$, $n_j$) is made, where ProjContour is a function projecting point $X_j$ and seeking, along the normal projection, the better contour among multiple hypotheses. These hypotheses are calculated locally since the edges are calculated along the normal direction and follow the signal amplitude, which leads to a detection of accurate and invariable edges according to the scale for the whole of the subject face. This method will be called by following the method of the normals.

The cost function may for example be implemented by using an M-estimator type approach such as the one used by the robust weight function of Tukey. Alternatively, a calculation of the residual of the closest point along the normal direction of the contour over multiple hypotheses may be made.

Ultimately, the equation to solve is:

$$\underset{\theta_{cam}, \theta_{model}}{\operatorname{argmin}} \left( \gamma \sum_{i=1...n} \|f_i, Proj(X_{s(i)})\|_2 + (1-\gamma) \sum_{X_j \in C(\theta_{cam}, \theta_{model})} \|Proj(X_j), cont_j\|_2 \right) \quad (1)$$

where $\|.\,,\,.\|_2$ represents the Euclidian distance and $\gamma$ is a parameter enabling the placing of more importance to one of the two parts of the cost function: either the contours or the features. This equation can be solved using the classical techniques of gradient descent well known by those skilled in the art.

The principal advantage of this estimation technique is that while multiple images are available, such as here in image sequence 200, it extends to a multi-image analysis algorithm which relaxes the constraint of semantic 2D/3D matching and allows the refining of all the estimated parameters. It can be used to discover the morphology of the best adjustment for all of the images.

It should be emphasized that when a scan of the face is made in 3D, producing in particular 3D data, for example through an infrared sensor or a depth camera of RGB-D type (acronym for "Red-Green-Blue-Depth"), a 3D/3D constraint is added. Thus, for each point of the model of the face $X_i$, we search to minimize the distance between the point of the model of the face $X_i$ and the 3D point closest to the scanned data $X_{p(i)}^{scan}$. We can thus add to the equation (1) the minimization of the following term:

$$\sum_{i=1...n} \|X_i, X_{p(i)}^{scan}\|_2$$

The third step of the method of development of the avatar concerns the addition of the 3D expressions of the face.

The expressions add a certain variability to the model of the face and their exclusion permits a more stable and precise estimation of the parameters of the pose and the morphology of the face.

One approach customarily used for the creation of parametric variations of a grid consists of using mixed shapes, that is to say an ensemble of geometric models linearly combine in order to produce unique instances. A commonly used technique for calculating these grid shapes consists of inferring them statistically such as is described in [A 3D Face Model for Pose and Illumination Invariant Face Recognition, Paysan et al., 2009].

The model presents the following shape:

$$g(\alpha) = g_m + \alpha \times V,$$

where $g(\alpha)$ is a vector representing a new shape and is written as $g(\alpha) = (x_1, y_1, z_1, \ldots, x_n, y_n, z_n)^T$, with $(x_i, y_i, z_i)$, and the $i^{st}$ peak, $g_m$ is the average 3D shape, $\alpha$ is a vector which contains the adaptation parameters belonging to the user and V is matrix which contains the Statistics Formulas database. In a general manner, Statistics Formulas databases only include the identity variations, regardless of changes of expression, to ensure a good ability to separate command parameters.

Nevertheless, the expressions are advantageously added to the model for the calculation in real time.

The 3D model is a wireframe model which can be deformed according to $g(\alpha,\beta) = g_m + \alpha V + \beta A$, where $\beta$ is a vector which contains the animation parameters, and A is a matrix which contains the animation units. Such as indicated in [CANDIDE-3—An Updated Parameterised Face, Ahlberg, technical report, 2001], the animation units matrix allows to ensure that the points tracked in 3D represent variations of expression.

Not only is this separation of parameters stronger than classical modeling, but it also simplifies the calculation in real time. Instead of managing all of the parameters of the 3D pose, the identity of the face and the expression are modified each frame during the tracking process, the constant identity parameters are provided based on the facial analysis stage. Only the 3D pose parameters and a small number of parameters of variation of expressions are estimated for each image.

The estimation completes the parameters of the model in a deformable form and is implemented based on the solving of:

$$\min_{R,T,\beta} \|Proj(g(\alpha, \beta); K, R, T) - p2D\|_2$$

where R is the 3D rotation matrix, T and the 3D translation, K is the intrinsic camera parameters, $\alpha$ is fixed during the facial analysis stage, p2D is the current position in the image of the point tracked in 3D.

The model of the face comprises a model of eyes connected by a rigid translation $T_{SE}$ between the frame of the model of the face and the frame of the model of the eyes.

Figure 4:
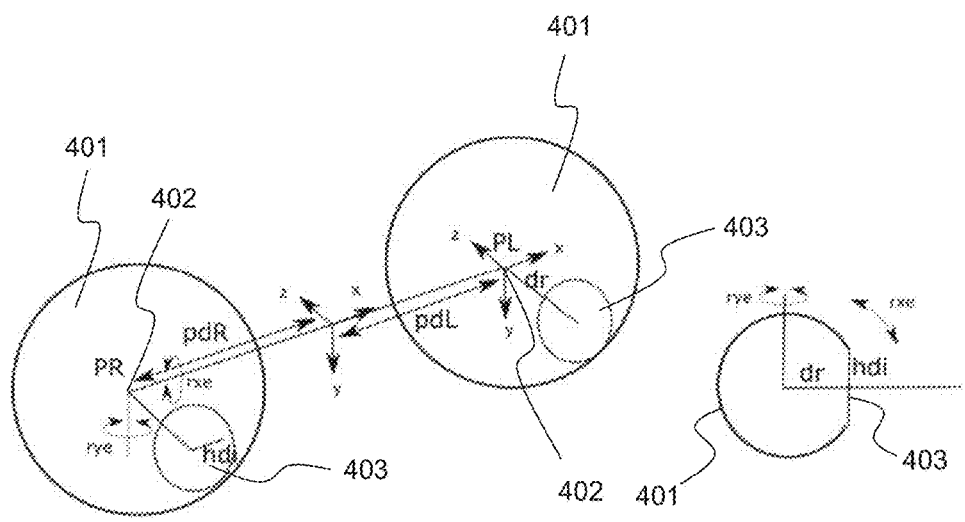
FIG. 4 illustrates the model of the eyes in the form of five views.
Figure 4:
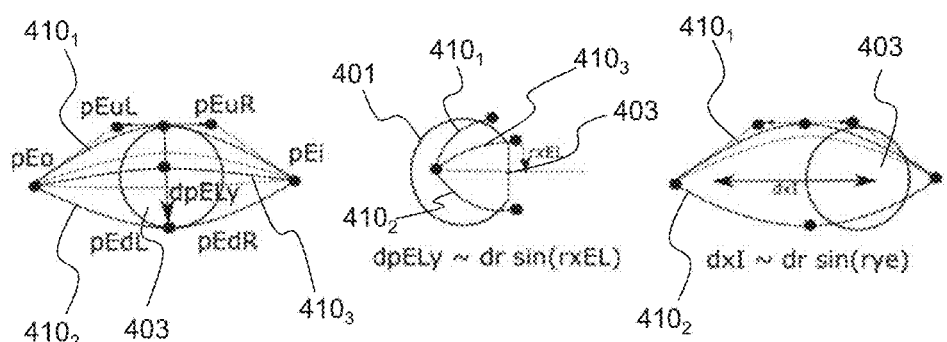

As illustrated in FIG. 4, the two eyes 401 are represented by two centers of rotation 402, noted as PS where S∈{R,L} corresponds either to the right side (S=R) or the left side (S=L). The two centers of rotation 402 are related to the frame of the eye system SE, by a distance pdS,S∈{R, L}. Each eye 401 is oriented relative to the frame of the eye system by the angle rxe, ryeS, S∈{R,L}, respective rotations around the x and y axes. The centers of rotation 402 are at a distance dr from the centre of the disc 403 of rayon hdi representing the iris. Disc 403 is included in an element comprised of three 410 Bezier curves of order 3 with the same control points of start and end, pEo, pEi, such as represented in FIG. 4c. The curves of the edges of the eyes may be represented in 3D on the grid of the face. It is important that the points pEo, pEi are at the intersection of the curves of the edges of the eyes, and that the curve that is displaced is parameterized by a parameter dpELv allowing the eyelid curve $410_3$ to range between the values of the higher curve $410_1$ and the lower curve $410_2$. This one-dimensional parameter can influence the 3D course of curve $410_3$ of the eyelid according to a curve defined in the space.

It should be emphasized that curves $410_1$ and $410_2$ are controlled by control points including respectively the points pEuL and pEuR, and the points pEdL and pEdR.

The 3D course of curve $410_3$ of the eyelid may be represented in the modes of deformation of the model of configurable morphology, according to the displacement of the position of the eyelid dpELy(t) given by the rotation rxEL around the x axis of the particular frame of the eye, where t comprised between 0 and 1 allows to configure the position of a point on the eyelid curve $410_3$.

It should be emphasized that the point of the eyelid curve $410_3$ where t is equal to 0.5 corresponds to the median point. In this point, the position dpELy(t=0,5) essentially moves to the disc of radius dr. We distinguish the configurations of the eye left and right L and R of dpELy, which allows the modeling of the closure of one single eyelid, contrarily to the parameter of the vertical rotation of the eye rxe for which the vast majority of cases the displacement of the left and right eye are the same.

The relation $T_{SE}$ enables the iris discs of the eyes in rotation around the points PL and PR touching the curves of the eyelids.

Based on image 220 where the face is detected, and for a pose $Pe_{Ma0}$, and of the intrinsic parameters of the face $Pi_{Ma0}$, the parameters $T_{SE}$, rxEL, rxe, {pdS,ryeS}; s∈{R,L}, are estimated at the moment of the pose of the model on the face for each image. The parameters of the positioning of the eye system SE in the frame of the face $T_{SE}$, as well as the parameters of pupillary distance pdR and pdL, are considered such as belonging to the morphology of the user and do not need to be recalculated once they are stable. They can be solved in relation to the reproduction of the model in an image, or based on all of the images captured. The solving of the parameters of the pupillary distance is described for example in the patent FR 2971873.

The resolution of the ensemble of the parameters $T_{SE}$, rxEL, rxe, {pdS,ryeS}; S∈{R,L}, is based on the following elements, considering one or multiple captured images:

in the case where we consider the difference between the projection of the model and the image: by a method of gradient descent which minimizes the difference of the synthesized appearance of the face with the image through a Lucas-Kanaof method;

in the case where we consider an alignment of the curves of iris $C_1$ and eyelid in the contour image: by minimizing the distances between the contours. To solve this minimization of distances between the contours, we consider the homologous points located on the default contour. The curves being parametric, it is easy to sample them with:

an angle parameter θ,θ∈[0,2π] for the iris curve which is a circle;

an evaluation parameter s, s∈[0,1] of the curve for the eyelid which is a Bezier curve of the 3rd order.

The difference between the sampled points $C_{I\theta i}$, and $C_{Esi}$ of the model projected to pose $Pe_{Ma0}$ for the intrinsic parameters $Pi_{Ma0}$, and the image of contour $I_{C0}$ of the face obtained with classical operators of the Canny or Sobel type is measured.

It should be emphasized that the difference between the sampled points and the image of contour may also be determined by a study according to the default method previously described.

It is also possible to solve the parameters of the pose by generating maps of the distance of the model of the projected contour, and to project the contour points of the image in this map for the calculation.

The two types of equation to solve are:

a) equation corresponding to the image difference for the solving of the eye system:

$$\underset{\{T_{SE}, rxe, ryES, pdS, rxEL, hdi\}; S=\{R,L\}}{\mathrm{argmin}} \|I(f_{projT} M_{a,SE}; K, Pe_{Ma0}, Pi_{Ma0}, dr) - I_0\|^2$$

where K is the matrix of the intrinsic parameters of the camera, $I(f_{projT})M_{a,SE}$ is the image generated by the projection of the avatar model and of the eye system by taking into account of the occultation of the eye system SE by the closing of the eyelids or by the auto-occultations due to the pose of the model. The generation of the image supposes a known texture. Thus during the initialization we add a calculation of the learning parameters relative to the texture using an active appearance model type. Upon initialization, the specific texture of the scene shall be used. It should be emphasized that the contour difference is advantageously used for the initialization for the reasons of performance and simplification of data.

b) equation of contour difference for the resolution of the eye system $$\underset{\{T_{SE}, rxe, ryES, pdS, rxEL, hdi\}; S=\{R,L\}}{\mathrm{argmin}} \sum_{\theta, s} \|Proj(C_{I\theta} C_{Es}; K, Pe_{Ma0}, Pi_{Ma0}, dr) - p(I_{C0}; \theta, s)\|^2,$$

where all of the points of the image $I_{C0}$ are selected along the default of the gradient to the curve considered for the projected $C_I$ or $C_E$, for the points of the curves associated to the values of the parameters θ and s.

In a variation of this particular embodiment of the invention, the function ProjContour is also used for the minimization of the eyes.

It should be noted that in order to render the system of equations robust in first initialization, the following default values are used:

hdi=6.5 mm, dr=10.5 mm for the initialization,
as well as the constraint pdR=pdL, ryeR=ryeL.
the value of the rotation rxe$_0$=0 for an average statistical value of rotation of the face of 0 degrees on an ensemble of significant knowledge. This allows the constraint of the resolution of the parameters of the eye system.

These values are then recalculated during the updating of the parameters.

In the case where we dispose of two calibrated images or of the map of depth, it is possible to easily find all of the parameters. These equations may be coupled to the solution of the extrinsic and intrinsic parameters of the face.

In the case of an image and a map of depth of the image, the estimation of the extrinsic and intrinsic parameters of the face is improved. Indeed, these values are used for perfect the estimation of the parametric model. If the parametric model does not entirely correspond because the settings do not allow to explain the depth, the model of the face is adapted on the surface, by solving the system described in equation (1) of 3D resolution of the face. Then we have not an estimation of the parameters of the face but an estimation of a metrological configured model of the face of the user.

Once the alignment between the model of the face, the model of the eyes and the image 220 is realized, the textures of the face $T_{aNG}$ and of the background $T_{bg}$, defined in more details here below, are updated during step 356 in order to correspond to the reality of the scene acquired by camera 132.

The texture $T_{aNG}$ 450, illustrated in FIG. 5, is a map of the face, calculated according to the classic methods of grid unfolding well known by those skilled in the art. Once the 3D face projected in the image, the visible faces, oriented towards the camera, for example by the z-buffer or culling methods, the filling of the image texture $T_{aNG}$ 450 is enable.

The textures of the eyes are distributed on the texture of the face and are decomposed into three parts: the texture of the iris $T_{aNG\_I}$ 451, the texture of the white of the eye $T_{aNG\_E}$ 452, the texture of the eyelid $T_{aNG\_EL}$. These three elements may be incomplete during the acquisition but may be completed in simple manner by interpolation for $T_{aNG\_E}$ and $T_{aNG\_EL}$ for the unknown areas to be synthesized or by knowledge of the topology for the non-visible parts, such as the top of the iris if the eye is not wide open. The circular nature of the pupil and of the iris allow for the completion of the texture according to a polar parameterization.

A map of background $T_{bg}$, also called map of the background or of background, is elaborated during step 357.

The map $T_{bg}$ corresponds to the background and all that is considered as not belonging to neither the real pair of glasses worn by the user, nor the face, nor any other element explicitly modeled, such as a model of the hair or an hand being superimposed on the face and on the pair of glasses 111. The map $T_{bg}$ is updated in a dynamic manner by following the ruled for updating such as are found in the classical techniques of background subtraction. We refer to the models of predominant color for each of the pixels, by using the distributions of probabilities and of the modes possible for the colors. Multiple models may be employed, such as a Gaussian mixture, or estimations of mode by kernels method on histograms. This model is coupled with an updated temporal and possibly spatial dynamic model.

For example, the updated dynamic model may be made in the following manner: such as in [Active Attentional Sampling for Speed-up of Background Subtraction, Chang et al., 2012], for each pixel, by taking into account a property of temporality $P_t$, a property of spatiality $P_s$ eliminating the isolated pixels and a propriety of frequency in the last images of the video $P_f$ allowing the elimination of the pixels changing too frequently and possibly being caused by noise. The product of these three values gives a probability for each pixel to belong to the map and to be updated.

The map of background $T_{bg}$ is initialized by all the pixels not considered such as the face projected or the pair of glasses projected in this step. The map of the background has the same dimensions as image 220.

In the interest of performance, and through complementary analyses of the models of tracking and analysis of points statistically aberrant, also called outlier points, the method of modification is used. This method comprises the steps during which:

For each new image I, a map of segmentation of the face $T_a$ is calculated based on the projection of the model of the face $M_a$ in the image. In the same fashion, the projection of the model of glasses $M_g$ allows the obtaining of the map of segmentation of the glasses $T_g$.

For each of these maps, a pixel belonging to the projection of the model has a value of 1 while the other pixels have a value of 0. Remaining in the simple case where there are no other models, each pixel p is processed in the following manner:

If $T_a(p)$=0 and $T_g$=0, $T_{bg}(p)$=I(p),
Otherwise, the texture is not modified.

It is also possible to calculate a map where for each pixel of $T_{bg}$, the number of images captured before the last update of the pixel is indicated, which allows to evaluate whether a pixel has been recently modified or not. It is thus possible to evaluate whether the value of a pixel is pertinent with respect to the pixels located nearby, according to the respective times of last update. This method of modification favors thus the recently modified pixels.

A model of occultation of the elements being superimposed on the face 121, such as for example a hand or a strand of hair, is developed during step 358.

The map of occultation is represented by dynamic texture $T_{fg}$ which is updated at each image of the sequence 200. We consider as occultation any disruption in the appearance of the models of the pair of glasses 111 and of the face 121, having a spatial and temporal consistency, which is distinguished from the characterization of the lighting on the face 121, of the shadows cast by the pair of glasses 111 or originally borne on the face (nose for example), or of the caustics created by the pair of glasses 111 on the face 121. The most probably case is that of hair or of a hand.

The map of occultation is associated to a geometric model $M_{fg}$ which may be variable. This may be a plane which represents a layer before the 3D scene, or a map of the depth estimated or available.

The value of the map of occultation is determined by the difference of the predicted appearance with the real image, that is to say by difference between the projection of the virtual models representing the face, the pair of glasses and the background and the real image. In other words, the map of occultation comprises all the elements which were not previously modeled.

In a variation of this particular embodiment of the invention, a technique of inpainting is used in order to fill in eventual empty spaces in the map of occultation, allowing thus the improvement of the appearance of the map of occultation.

Likewise, for small elements, smaller than the size of a pixel in the image, such as for example a fine strand of hair presented together with an element of the face or an element of the pair of glasses 111 in a pixel, the map of occultation takes into account degrees of local opacity. This modification of opacity is currently used for solving the problems of digital matting. We assign the name $T\alpha_{fg}$ to the opacity channel at the grey level of the map of occultation, and $TB_{fg}$ its binarization for the opaque pixels of value 1.

In the case of use of a depth sensor, the detection of the occultation is easier and methods well known by those skilled in the art can be applied. However, in the present case where the user wears the glasses, the RGBD sensors based on infrared technologies obtains a very poor signal because the pairs of glasses are generally made of complex materials and comprising high dynamic, such as metal, translucent plastic and glass. The effects of diffraction and reflection of these materials impede the system of creation of the map of depth from functioning correctly. On the other hand, the spatial resolution of these sensors is not sufficient for very thin glasses. Whereby, not only are glasses not or very poorly identified by the system, but they corrupt or render inaccessible all of the data of the face located in the vicinity and background. The use of the image and of the parametric model of the pair of glasses proposes to allow the neutralization of these structural problems of the depth sensors.

The textures of the pair of glasses, of the face and/or of background are completed and updated during step 359 of the image generation method.

During the process, the status of the maps representing the elements attached to the image evolves according to the knowledge of the elements. In the present example, the face of the individual 120 is in part masked by the pair of glasses 111. New elements of the face of the individual 120 appear when the individual 120 turns the head. The color information may also be distorted due to the reflection of the lenses, particularly in the case where the lenses are tinted or due to the shadows cast by the pair of glasses 111 on the face.

Thus, it is possible for a pixel data of an established map such as for example the map of background, or that of the face, the information of color not being available once the user is no longer displaced enough to make the required area appear.

The learned statistical models used in the area of the face, but are less efficient than those of the background. We may thus replace the pixels of the area of the face with known techniques such as active appearance models or of the 3D morphable models.

In the case where the prediction of appearance is not possible, the technique of filling by spatial locality is used. The technique of filling, similar to the techniques of inpainting well known by those skilled in the art, relies on the synthesis of texture, by applying the relevant knowledge for the reliable and real time of solution of the problem of filling. Given that the topology of the models of glasses is known, and that the real-time constraint is important, the filling by patch is used, which will guarantee the continuity of the colours between the painted areas and respect of the structures of the textures. This technique allows us a quick search of the similar elements in the image as well as the parallel processing of the majority of the pixels to be replaced.

The technique of filling real time relies on a technique of inpainting well known by those skilled in the art.

The filling of the areas to be processed is made by pixel or by patch, by using an algorithm in three steps:
1. calculation of the priorities of the patches,
2. propagation of the texture and of the information of structure,
3. updating of the trusted values.

In the present non restrictive example of the invention, the patch is formed by a square window centered on a pixel.

By knowing the topology of the different elements, such as the pair of glasses 111 and the model of the face, the filling of the areas is made in real time by furnishing multiple advantages by use of techniques currently used by those skilled in the art:
Independent of direction;
possibility of working by arbitrary size of patch (to the pixel);
avoiding systematic and costly search of similar patches;
and guarantee of the continuity of the colors while filling.

The calculation of the priority of the patches, well known by those skilled in the art, is followed for the areas for which no information is available, such as for example the pixels of the mask corresponding to the background area.

However, for the pixels located on the area of the face, the knowledge of the topology of the face allows the definition of the directions and priorities of direction and the a priori areas of sampling of the patches. For example, if the eyes are closed, we know in advance in a parametric manner the geometric model of construction of the eyes, and we can thus adapt the priority, the size of the patches and the direction of propagation according to the curves linked to the particular topology of an eye.

In the areas where we do not have information on the underlying parametric structures, such as the background or the skin, it is the knowledge of the topology of the pair of glasses which allows the predefinition of the directions of the propagation of the structures according to the perpendicular line of the skeleton of the shape or perpendicular to the contour.

It should be emphasized that the propagation of the structures is similar as the direction of propagation of the isophotes, for any pose of the face. Indeed, the pair of glasses, although it may have a thick frame, has projections in the image such that the different edges of a same sub-object are almost parallel.

By focusing the true direction to the topology of the pair of glasses, two aspects are improved. First, the search of patch is reduced to the first patch found containing the information in this direction. Naturally, at each iteration, the pixels replaced in the preceding iteration are used, allowing a continuity of the structure. The direction of propagation is also predefined and is not calculated for the patches deemed very structured by a criterion of structure. For example, the entropy of patch considered, or a coefficient dependant on the default of the directions of the gradients, may be used. This approach avoids a systematic classification and cost of the priorities as well as of the directions of propagation.

In order to guarantee the continuity of the colors while preserving the structure, and avoid directional smoothing that may be observed in paths of "onion peel" type, the following method is used:

Either the patch to be replaced T0 centered on a pixel p0 to a distance of front of the mask to be replaced so that the patch contains the pixels of a known area. We define a maximum distance of confidence $d_{max}$ which guarantees a continuity of the structures, and we move within the two paths of default direction to the contour $\vec{n}_C$ of the glasses mask to find the two full patches T1 and T2 (centered on pT1 and pT2) in the closest "texture" areas. This technique allows to reduce the search calculations of the closest colorimetric patch. We then make a colorimetric adaptation to replace the pixels of patch T0, by taking into account the distance d1 of p0 to pT1 and the distance d2 between p0 to pT2 in order to allow the following linear interpolation:

$$pi(u, v)_{T0} = \frac{d1}{(d1+d2)} * pi(u, v)_{T1} + \frac{d2}{(d1+d2)} * pi(u, v)_{T2}, \text{iff}$$

$$d1 < d_{max} \text{ and } d2 < d_{max}$$

where each $pi(u,v)_T$ corresponds to a pixel of a patch T. The notation iff corresponds to the abbreviation of "if and only if".

In other cases, we have:

$$pi(u,v)_{T0}=pi(u,V)_{T1}, \text{iff } d1<d_{max} \text{ and } d2 \geq d_{max}$$

$$pi(u,v)_{T0}=pi(u,v)_{T2}, \text{iff } d1 \geq d_{max} \text{ and } d2<d_{max}$$

This process is recalled multiple times until all the pixels of the mask are processed.

To avoid the onion peel effect, and to not reproduce artifacts of structure due to the compression of the image, for the patches of small size (up to a pixel), we add a random local distortion for the areas of weak structure. A uniform or Gaussian noise may be used. This uniform noise is estimated according to the average noise of the known surrounding areas of the image by the techniques well known by those skilled in the art. Entropy may be used to order the structures, if this latter is not yet known through the model. The replaced area may be the pixels to be replaced of complete patch or even a smaller patch of up to a pixel.

It should be emphasized that the sizes of patch are dependent on the size of the structure to be replaced, namely of the thickness of the pair of glasses, and of the distance of the user to the camera.

Figure 6A:
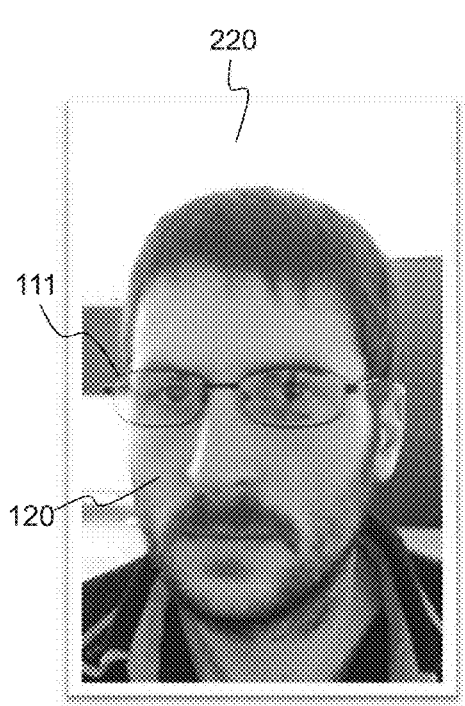
Figure 6:
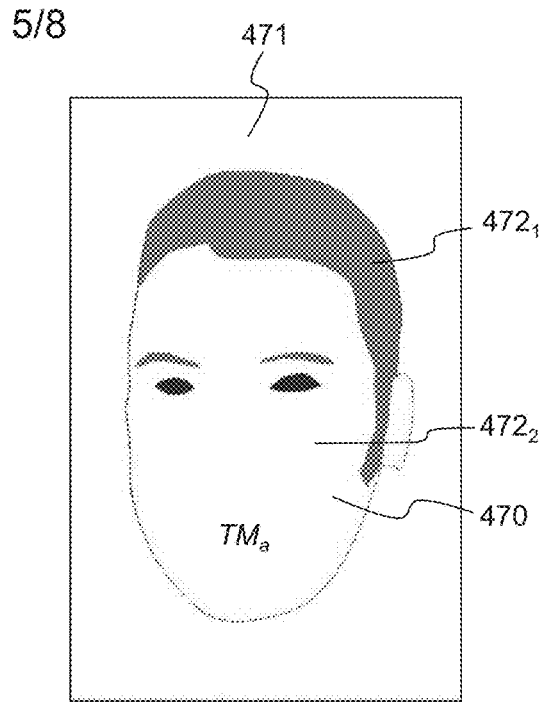
Figure 6:
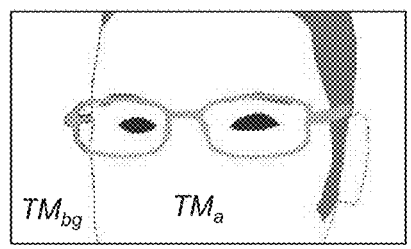
Figure 6:
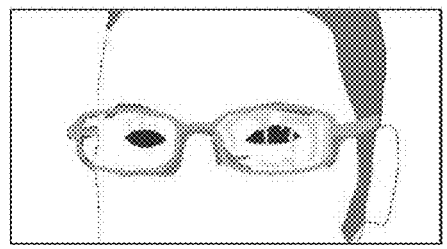
Figure 6:
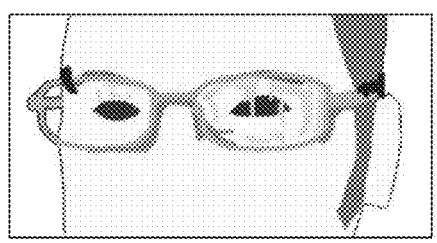

FIG. 6 illustrates the development of the masks based on the image 220 of the user 120 (FIG. 6*a*). Such as illustrated in FIG. 6*b*, the environment $I_{bg}$ to the background of the pair of glasses 111 is decomposes in multiple areas:
    an area 470 corresponding to the face; and
    an area 471 corresponding to the background.

It should be emphasized that the area 470 may be subdivided into semantic subregions 472, corresponding for example to the region of the hair 472$_1$, to the region of the skin 472$_2$.

During step 360, the method of generation creates the mask of the pair of glasses 111 by geometric projection of the three-dimensional model of the pair of glasses 111 on a first layer.

It should be emphasized that the first layer is previously flushed prior to the geometric projection. Thus, the first layer contains an image of the three-dimensional model of the pair of glasses 111 according to the same angle of view and the same size as the real pair of glasses 111.

The mask $TM_g$ of the pair of glasses 111 is divided in multiple parts:
    The mask $TM_{g\_f}$ of frame 112*b* and of the temples 117; and
    The mask $TM_{g\_l}$ of the lenses 113.

A mask $TM_{g\_e}$ corresponding to lighting effects borne on the face, particularly the reductions and the shadows, is created simultaneously. The mask $TM_{g\_e}$ also comprises the lighting effects on lenses, particularly reflections.

The mask $TM_{g\_f}$ corresponds to the image rendered RGBA of the model of the pair of glasses 111 for the values of parameters of the face $Pe_{Ma}$ and glasses $Pe_{Mg}$ estimated in the instant corresponding to the image 220. The mask $TM_{g\_f}$ reflects the future occultation of the pair of glasses 111 such as for example a hand placed in front of the face or a strand of hair falling on the face.

A binary mask $TMB_{g\_f}$ is obtained by binearizing the rendered alpha layer of the mask $TM_{g\_f}$. The alpha layer representing the transparency of the pixels, the binearizing of the alpha layer alpha allows to delimit the mask $TM_{g\_f}$.

FIG. 6*c* represents the environment $I_{bg}$ from the FIG. 6*b* to which the mask $TMB_{g\_f}$ is added.

The masks $TM_{g\_l}$ and $TM_{g\_e}$ are determined by following the same technique as for the mask $TM_{g\_f}$, by considering respectively for each mask lenses 113 and the lighting effects such as the reflections on the lenses or the shadows cast on the face.

The mask $TM_a$ corresponding to the face is created during step 365 based on the model of the face including the eyes, according to the parameters of orientation and of positioning of the face previously estimated for the image 220.

It should be emphasized that the linear mask $TMB_{g\_f}$ of the pair of glasses is contained in the region of the face $TM_a$ or in the map of background $T_{bg}$, such as we can see in FIG. 6*c*.

Through the topological knowledge of the subject pair of glasses, a sampling is made in the location defined on either side of the mask $TM_{g\_f}$, according to a parameterization given by the topology of the pair of glasses, in the direction of the default to contour $\vec{n}_C$.

Thus, the temple of the pair of glasses is sampled on each side in the areas of maximum size representing a partition $\Omega_R$ of the regions defined by $TM_a$ or $T_{bg}$. In the present case, an adjustment of the trimming of the space is made along the frontal curves of the regions. Thanks to this trimming, it is possible to estimate the field of local colorimetric transformations between the prediction of appearance and the current image, for the regions the face $TM_a$ and background $T_{bg}$ independent of the region glasses $TM_g$, which allows the finding of the transformations due to the changes of overall lighting, or to the shadows cast.

For the face, the areas not responding to this colorimetric dynamic may not be considered at first, such as for example the eyebrows, the hair or the beard, in order to concentrate on the skin, following a pseudo-Lambertian dynamic and allowing a basic and low frequency adaptation of the colors. These areas are identified and segmented through points and curves found through the knowledge of the characteristics identified and can be displayed in the texture space. We then calculate in the areas of same type the transformation, similarly as in the techniques of color transfer or of tone mapping well known by those skilled in the art.

This field of colorimetric transformations is respectively applied to images $TM_a$ and $T_{bg}$ to form the maps $TM_aWc$ and $T_{bg}Wc$. It should be emphasized that the color conversion is performed on coherent colorimetric sub-regions of the images $TM_a$ and $T_{bg}$. These coherent sub-regions may be advantageously comprised in a semantic sub-region 472 in order to improve the final result. In addition, the color conversion takes into account the differences of dynamic between the sub-regions of these spaces.

These new images $TM_aWc$ and $T_{bg}Wc$ are used for analyzing the pixels of the current image I where the color is not determined by the prediction, particularly in the areas of the lenses and the face, in order to detect the reflections and lighting and geometric adjustments of the lenses $TM_{g\_l}$, as well as the shadows cast by the frame $TM_{g\_e}$ in the related regions. This technique particularly enables the correction of the distortions of the face due to the optical correction of the lenses of the pair of glasses 111 worn by the user 120.

We thus fill the maps $TMB_{g\_l}$ and $TMB_{g\_e}$ for each pixel x of the regions considered, according to the measure $$\forall x \in \Omega_R, x = \begin{cases} 1, & \|TM_a Wc(x) - I(x)\|^2 < \epsilon \\ 0, & \text{otherwise} \end{cases}$$

with $\Omega_R$ a consistent colorimetric sub-region of the region $\Omega = \{x; TMB_a(x)=1\} \cup \{x; TMB_{bg}(x)=1\}$. The threshold E is large enough to encircle the aliasing colors and erase the artifacts of image compression and of the sensor. The mask may be then expanded according to the confidence in the knowledge of the 3D object and to the recalibration.

FIG. 6d represents the image from FIG. 6c to which is added the map $TMB_{g\_e}$ representing the lighting effects, reflections and shadows.

The map of the pixels to be replaced $TMB_g$ is a joining of the maps $TMB_{g\_l}$, $TMB_{g\_e}$, and $TMB_{g\_f}$ excluding the pixels of the alpha map of occultation $TB_{fg}$.

$$TMB_g = \cup \{TMB_{gl}, TMB_{ge}, TMB_{gf}\} \setminus TB_{fg}$$

The alpha map of occultation $TB_{fg}$ represents the opaque pixels of the map of occultation $TB_{fg}$, that is to say the pixels of $T_{fg}$ where the alpha value is equal to 1.

FIG. 6e represents the image from FIG. 6d to which the alpha map of occultation $TB_{fg}$ is added.

The modification of the appearance of the mask representing the pair of glasses 111 is performed during step 370.

Based on the image 220, and on all of the masks created, the modification of the appearance replaces the pixels of the image 220 corresponding to the linear mask $TMB_g$ by adequate values which permit it to suppress or to apply a treatment on visible parts of the pair of glasses 111 in the image 220.

The chosen colors may be issued by the following techniques or by their combinations:
  a. colors of prediction corresponding to evaluated geometric parameters and colorimetric adjustment;
  b. colors statistically learned offline related to a model of the shape;
  c. colors without a priori knowledge which guarantees spatial coherence and a continuity of the colors, being able to be coupled to an a priori knowledge of shape;
  d. colors statistically learned during process 300.

In any case, a constraint of continuity of the colors around the borders of the mask is integrated in an implicit or explicit manner.

The technique favored in the present example is the replacement of color by prediction, as it best manages the discontinuities of the model. While it may be sensible to an error of estimation, the addition of a dilatation of the mask as well as a constraint of continuity of the colors enables the proposal of replacement results that are undetectable to the human eye. Through calculated maps $TM_a Wc$ and $T_{bg} Wc$, and the map $T_{fg}$, the entirety of the pixels may be replaced in the majority of cases.

The final image 210 is then generated during step 380 of method 300 by flattening the various layers superimposed on the initial image 220, namely from the background:
  initial image 210;
  first layer including the mask of the pair of glasses 111;
  second layer including the mask of occultation.

Thus the individual 120 wearing the pair of glasses 111 sees his image on the screen 130, such as in a mirror, without the pair of glasses 111 remaining on its face. He may thus virtually try on the new pair of glasses 110 which are positioned on the face instead of the real pair of glasses 111. The virtual pair of glasses 110 is positioned on the face 121 of the individual 120 through an intermediate layer inserted between the first layer and the second layer. The intermediate layer comprises a projection of a model of the virtual pair of glasses 110 positioned in a realistic manner on the face 121 of the individual 120.

For the technical details of the positioning of the virtual pair of glasses 110 or of the generation of the intermediate layer, those skilled in the art may for example refer to application FR 10 50305 or to application FR 15 51531 describing in a detailed manner the techniques allowing the trying on of a virtual pair of glasses by an individual.

Another Example of a Particular Embodiment of the Invention

FIG. 7 represents a try-on device 500 for a virtual object 510 by an individual 520 wearing the pair of glasses 111 on the face.

Device 500 comprises a touch screen 530 fixed vertically on a support 531, a camera 532 centered above the screen 530, two peripheral cameras 533 and a processing unit 534.

Device 500 also comprises a measuring device 537 of the distance of an element in relation to the screen 530, including an infrared projector 535 projecting a design and an infrared camera 536.

Device 500 also comprises a modeling device 540 including a turntable 541 intended to receive a pair of glasses at its centre, two fixed digital cameras 542, oriented towards the centre of turntable 541 and a background unit 543 intended to be in the background of the pair of glasses being modeled. Modeling device 540 links to the processing unit 534 and can thus activate the turntable 541 and capture the images of the pair of glasses 111 under various viewing angles.

In a variation of this particular embodiment of the invention, the turntable of modeling device 540 is immovable. Modeling device 540 also comprises two fixed supplemental digital oriented towards the centre of the turntable. The position of the two supplemental cameras corresponds to the 90-degree rotation of the position of the two cameras 542 around of the central normal axis on the turntable.

It should be emphasized that modeling device 540 performs a calibration by acquiring an image of background unit 543 alone for each camera 542.

The individual 520 removes the pair of glasses 111 which he wears on the face and places them, temples 117 open, in the centre of turntable 541. In order to properly position the pair of glasses 111, markings are indicated on turntable 541.

The first camera $542_1$ focused in such a manner that the optical axis of the camera $542_1$ captures a frontal image of the pair of glasses 111, then after a rotation of 90° of the turntable 541 an image of the side of the pair of glasses 111.

Simultaneously, the second camera $542_2$ captures images of the pair of glasses 111 in top view, from ¾ of the front and from ¾ of the back. The position of the camera $542_2$ is thus elevated, to approximately 45° relative to the median plane of turntable 541.

A three-dimensional model of the pair of glasses 111 is created based on the four images captured of the pair of glasses 111 and the two images of the background.

For this purpose, the pair of glasses 111 is segmented in each captured image indicating the difference between the images of background and the images with the pair of glasses 111, which permits the creation of the binary masks of the various elements.

For the modeling, the frame 112 of the pair of glasses 111 is considered as an assembly of three 3D surfaces:
- a surface representing face 112b of the pair of glasses 111 and
- a surface for each temple 117 of the pair of glasses 111.

It should be emphasized that since the pair of glasses 111 is symmetrical, the two temples 117 are similar and only the angle of opening between each temple 117 and the face 112b may vary. Only a three-dimensional model of a temple 117 is thus generated. The three-dimensional model of the other temple 117 is then created based on the model of the first temple 117 symmetrically relative to the principal median plane of the first temple 117.

In order to estimate the 3D surface, a calculation of the map of distance is made for each of the images based on the masks extracted from the segmentation. The estimation of the parameters of the 3D surface is made via a minimization respecting the criteria of central symmetry and of continuity of the frame of the pair of glasses 111.

An estimation of a 2D contour of face 112b and of the temples 117 is performed based on of the binary masks of face 112b and of the temples 117.

The 2D contour is then projected on the corresponding 3D surface. A thickness is added to each of the 2D contours projected on the surfaces for obtaining the three-dimensional models of Face 112b and of the temples 117 forming the three-dimensional model of the pair of glasses 111.

For this purpose, based on the points of the 2D contours, a Delaunay triangulation is made. This triangulation is used on the points of the 3D surface for generating the model of the pair of glasses 111. The images captured of the pair of glasses 111 are applied in texture on the model of the pair of glasses 111.

It should be emphasized that the 3D statistical models of each element of the pair of glasses 111 may be used for the setting and the grid of 3D surfaces based on 2D contours.

An image of the individual 520 without glasses is acquired by camera 532.

Based on the image of the individual 520 without glasses, a model $M_a$ of an avatar representing the individual 520 is developed based on the images captured and the measures of the distance on the screen of the elements of the image, according to the method of development of the model of the avatar $M_a$ previously described in step 355 of the first example of the embodiment.

A flat texture of the face of the individual 520 is extracted from the avatar model $M_a$.

Before obtaining a mask in 2D of the pair of glasses 111, the pair of glasses 111 is tracked in the sequence of images captured by camera 132 by a tracking method 600 of the pair of glasses 111.

The tracking method 600, illustrated in the form of a schematic diagram in FIG. 8, comprises one first initialization step 610.

Initialization step 610 allows the positioning of the model $M_g$ of the pair of glasses 111 on the avatar Ma and of opening the temples of the model $M_g$ in the same manner as the pair of glasses 111 actually placed on the face of the individual 520.

For this, a first positioning of the model $M_g$ is made in 3D on the avatar $M_a$ in the manner of the model of the pair of glasses 111 rests on the nose of and the ears of the avatar. The model $M_g$ is thus positioned according to of the parameters of calculated poses. The parameters of poses comprise the orientation in relation to the camera and the enlargement to be applied to model $M_g$ for obtaining the pair of glasses 111 displayed in the image.

The avatar is positioned and oriented according to the virtual camera having the same orientation and the same optical parameters as camera 532. For this, the position and the orientation of the face are determined on each image through a process of tracking of the face well known by those skilled in the art. The tracking of the face is based on the tracking of characteristic points of the face. However, it is emphasized that the characteristics masked in the image, particularly those found behind a pair of glasses or behind tinted lenses, are not taken into account in the tracking of the face.

A projection of the model of the pair of glasses 111 positioned on the avatar, on a first layer superimposed on the initial image, enables to obtain a mask of the pair of glasses 111.

In order to refine the position of the mask of the pair of glasses 111 on the first layer, the parameters of pose are calculated by minimizing a cost function based on two components:
- a component calculated according to the characteristic points of the face and of the eye system visible in the preceding image in the sequence and according to prior images of the sequence;
- a component calculated according to the contours of the pair of glasses 111 in the image and to the model $M_g$ of the pair of glasses 111 previously synthesized.

After having initialized the model $M_g$ of the pair of glasses 111, the tracking method 600 selects, during a second step 620, the set ω of the points of the model $M_g$ where the default is essentially perpendicular to the axis formed between the point and the virtual camera.

It should be emphasized that in the case where face 112b of the pair of glasses 111 is essentially parallel to the plane of the camera 132, the temples 117 being less visible, only the face of the model $M_g$ is taken into account in the tracking of the pair of glasses 111.

It also should be emphasized that in the case where the face is turned sharply, rendering face 112b less visible, only the temple of the model $M_g$ is taken into account in the tracking of the pair of glasses 111.

During the third step 630, the tracking method 600 selects a sub-sample of n points among the set ω of the points of the model $M_g$. The projection $p2D_{m=1\ldots n}$ of the n points in the image presents an essentially uniform and regular spacing. Thus, while face 112b of the pair of glasses 111 is nearly parallel to the image plane of the camera, the sub-sample comprises a low or null number of points of the temples.

The vectors $n2D_{m=1\ldots n}$ corresponding to projections of the normal of the n points of the ensemble ω are calculated during the fourth step 640.

Based on the projections p2D and of the vectors n2D, process 600, seeks, for each index m, a point $p\_grad_m$ of the image having the strongest gradient of the length of the projection $p2D_m$ of the normal to the point $n2D_m$.

The method of tracking 600 then minimizes during the fifth step 650 the function of calculation of the distance between points p2D and p_grad. When the minimal value is attained, the position of the model $M_g$ is considered as representative of the real position of the pair of glasses 111.

A mask covering the pair of glasses 111 is created based on the projection of the model $M_g$ on the first layer.

The modification of the appearance of the mask of the pair of glasses 111 is performed by replacing the color of frame 112 of the real pair of glasses 111 worn by the individual 520 by a new color.

An adjustment of the brightness is performed in order to render realistic the modification of the color of frame 112.

Thus, the individual 520 sees his image on the screen 530 with the same pair of glasses 111 but including a different color of frame 112.

Another Example of a Particular Embodiment of the Invention

FIG. 9 represents an augmented reality device 800 used by an individual 820 wearing the pair of glasses 111 on the face. In this example, the pair of glasses 111 is mounted with corrective lenses adapted to the vision of the individual 820.

Individual 820 stands facing a camera 832 linked to a screen 830 displaying live the image of the head 821 of the individual 820 such as in a mirror. The image displayed on the screen 830 presents the head of the individual 820 without the pair of glasses 111 on the face of the individual 820. Individual 820 may thus clearly see himself without his pair of glasses, as if he were wearing lenses.

In order to suppress in real time, the pair of glasses 111 actually worn by the individual 820 in each image, based on a given moment, of the sequence of images, also called video, displayed on the screen 830, a generation method of the final image based on an initial image is used.

During this process, the pair of glasses 111 is detected and tracked in each image of the sequence of images. A model of the pair of glasses 111 is generated and oriented in an identical manner to the pair of glasses 111 in order to create a mask by projection on a layer to be superimposed on the initial image.

The appearance of the mask covering the pair of glasses 111 is adjusted in order to erase on the screen the pair of glasses 111 worn on the face of the individual.

For this purpose, a flat map of the environment in the background of the pair of glasses 111 is created and updated in a dynamic manner by taking into account the information captured in each image of the video.

One method of inpainting allows the determination of the color of each pixel of the mask of pair of glasses 111 according to at least one pixel of the image near a pixel of the mask.

It should be emphasized that in the generation method used in the present example the face is included in the environment of the pair of glasses 111 but it is not detected for the development of the map representing the environment. Only the pair of glasses 111 is detected and tracked.

In variations of this particular embodiment of the invention, the presence of the face of the individual 820 is detected but is not tracked. A model of the face is thus generated and positioned in relation to the position of the pair of glasses tracked in the image. The model of the face is used in projection for the development of the map of the environment. The model of the face may also be directly used by the method of inpainting.

Individual 820 may try on a virtual pair of glasses or makeup and see himself on the screen with it. It should be emphasized that in the case of trying on a virtual object, only the appearance of the visible part of the pair of glasses 111, that is to say non covered by the projection of the virtual object, possibly advantageously adjusted, enabling thus to save time in calculation.

Another Example of the Embodiment of the Invention

FIG. 11 represents a screen 910 displaying a video 915 stored in a computer memory, or a real time video stream from a camera.

The video 915 presents the head of an individual 920 wearing the pair of glasses 111 on the face 921 before processing.

FIG. 12 represents the screen 910 displaying the video 915 but in which the pair of glasses 111 is suppressed in each image of the video by a generation method of the final image based on an initial image according to the invention.

During this method, face 921 is detected and tracked in each image of the video. In each image, the process adds a layer including an opaque mask covering the pair of glasses 111. It should be emphasized that the mask is sized to cover the majority of shapes and sizes of pairs of glasses. The mask is therefore not bound to the pair of glasses 111 which is not detected in the present example.

The process generates thus a layer for each image, on which the mask is oriented and sized in relation to the detected face.

For each layer, the method of generation applies to the mask a texture originating from the model of the face previously created without the pair of glasses.

In order for the final image to be realistic, the generation method comprises a technique of "relighting" of the texture of the mask, enabling the adjustment of the color matching of the texture to the actual light illuminating the face 921.

In order to enable the analysis of light sources, well known techniques are used, such as for example photometric stereo or the technique called "shape from shading", on the parts of the face such as the skin which is tracked in a pseudo-Lambertian surface model. The light sources and their parameters are then used such as a synthetic source for the "relighting" of the face.

Apertures may be established on each mask at the level of the eyes of the face 921 in order to render the eyes visible on each image.

It should be emphasized so in order that, for of the reasons of realism, the apertures are not created on the mask while the eyes are optically by the lenses of the pair of glasses 111 or when the lenses are tinted.

In the case where the apertures are not created on the masks, a layer including the pairs of resynthesized eyes is added above the layer of the mask.

The orientation of the synthesized eyes may advantageously be set based on the actual orientation of the eyes detected and tracked by techniques well known by those skilled in the art.

Other Advantages and Optional Characteristics of the Invention

In variations of implementation of the invention, the real object erased from the image may be a hat, a scarf, hair or any other element partially or totally covering a face. The method can also be applied to any other real object we seek to suppress in an image, such as for example an article of clothing worn by an individual.

In variations of implementation of the invention, an object to be placed on the face of an individual replacing the pair of glasses worn on the face such as makeup, jewelry or clothing. An individual wearing a pair of glasses may thus virtually try on makeup or formal attire while the worn pair of glasses is removed from the image, enabling thus the simulation of wearing contact lenses. It should be emphasized that in the case of trying on an article of clothing worn on the body of the individual, such as a suit or an evening gown, a scan of the morphology of the body of the individual may be useful for obtaining a realistic rendering of the clothing.

In variations of implementation of the invention, an individual wearing a pair of glasses can see himself on the screen with the same pair of glasses but with the frame presenting a color, texture and/or materials different than those of the frame of the pair of glasses worn in reality.

In variations of implementation of the invention, an individual wearing a pair of glasses can see himself on the screen with the same pair of glasses but with lenses of a different tint than those of the lenses of the pair of glasses worn in reality.

In variations of implementation of the invention, an individual wearing a pair of glasses can see himself on the screen with the same pair of glasses but with lenses including a different treatment than those of the lenses of the pair of glasses worn in reality. The treatment corresponds to the addition or the suppression of one or a combination of treatments well known to opticians, such as for example anti-reflective treatment or thinning of the lenses.

In variations of implementation of the invention, an individual wearing a pair of glasses can see himself on the screen trying on a new virtual pair of glasses where the areas of the lenses of the real pair of glasses included in the image of the interior of the rims of the virtual pair of glasses are retained, enabling thus the augmentation of the realism of the virtual pair of glasses. Indeed, by retaining a part of the real lenses, the real reflections due to the environment are also retained in the image. It should be emphasized that the color of the retained parts of the real lenses may be modified in order to obtain a virtual pair of glasses with tinted or non-tinted lenses, all while retaining the real reflections of the lenses.

In variations of implementation of the invention, a virtual object is partially on the real object to be erased in the image and only the visible parts of the mask corresponding to the real object are modified.

In variations of the implementation of the invention, the real object is erased from part or the majority of the image.

The invention claimed is:

1. A method for generating a final image from an initial image comprising a physical object suitable to be worn by an individual, comprising the steps of:
   acquiring an image of the individual wearing the physical object on the individual's face, said image being the initial image;
   detecting a presence of said physical object in the initial image;
   generating a mask at least partially covering the physical object in the initial image;
   superposing a first layer on the initial image, the first layer including the mask at least partially covering the physical object in the initial image;
   generating a texture reproducing element in a background of the physical object to suppress all or part of the image of the physical object in the final image; and
   modifying an appearance of at least one part of the mask by applying to the mask the generated texture.

2. The image generation method according to claim 1, wherein the modification of the appearance of the mask comprises a step of substitution of a texture of all or part of the object in the final image.

3. The image generation method according to claim 1, wherein the mask also covers all or part of a shadow cast by the object.

4. The image generation method according to claim 1, further comprising the steps of superposing a second layer on the initial image over the first layer, the second layer including an element at least partially covering the mask.

5. The image generation method according to claim 1, prior to step of superposing the first layer, further comprising the steps of:
   determining an orientation of the object in relation to a capture device acquiring the initial image; and
   determining a characteristic dimension of the object in the initial image.

6. The image generation method according to claim 5, prior to step of superposing the first layer, further comprising the steps of:
   calculating a three-dimensional model of the object; and
   calculating the mask by geometric projection of the three-dimensional model on the first layer, the model having on the first layer the same orientation and the same characteristic dimension as the object.

7. The image generation method according to claim 6, wherein the calculation of the model of the object is performed based on:
   at least one image of the object alone; or
   at least an image of the object worn on a face of the individual.

8. The image generation method according to claim 1, wherein the object comprising a frame extending to either side of a face is worn on the face of the individual; and further comprising a step of identifying the frame from frames previously modeled, the mask having been generated based on the model of the identified frame.

9. The image generation method according to claim 8, wherein the identification of the frame is based on at least one of the following criteria:
   support curves generated and adjusted to contours of the frame;
   a shape of the frame;
   one or more colors of the frame;
   one or more textures of the frame; and
   a logo presented on the frame.

10. The image generation method according to claim 1, further comprising a step of calculating a representation of an environment of the object.

11. The image generation method according to claim 10, wherein the step of modification of the appearance of the mask comprises sub-steps of:
    geometric projecting the representation of the environment on which an intermediate layer is superimposed on the first layer; and
    determining a new color of a pixel of the mask according to a color of at least one pixel of an intermediate layer near the pixel of the mask.

12. The image generation method according to claim 10, further comprising a step of detecting a presence of a face in the environment and in that a representation of the environment comprises a model of the detected face to which a texture of the face is applied.

13. The image generation method according to claim 12, further comprising a step of determining an orientation of the face relative to a capture device and in that the model of the detected face is essentially positioned according to an orientation previously established.

14. The image generation method according to claim 12, wherein the mask at least partially covering the object worn on the face is developed based on the geometric projection of the model of the face on the first layer.

15. The image generation method according to claim 12, further comprising the steps of:
estimating a colorimetric transformation from the initial image of at least one pixel of the model of the face; and
converting one or more colors of all or part of the model of the face.

16. The image generation method according to claim 15, wherein a color of a pixel on the texture of the face is determined through an inpainting method based on one of the following criteria:
colors of a patch near the pixel, a position of the patch being essentially located on at least one of a perpendicular and on a vertical of the pixel; and
the model of the face, previously established and oriented, the model of the face including a representation of eyes.

17. The image generation method according to claim 12, further comprising a step of identifying at least one ocular region on the texture of the face, the ocular region corresponding to a position of an eye of the detected face.

18. The image generation method according to claim 17, wherein the ocular region is filled with a knowledge of a topology of the eye of the detected face.

19. The image generation method according to claim 10, wherein the calculation of the representation of the environment of the object worn on a face of the individual is generated without detecting the face in the environment.

20. The image generation method according to claim 10, wherein the calculation of the representation of the environment comprises a sub-step of correction of an optical distortion caused by a transparent element positioned between the environment and a capture device acquiring the initial image.

21. The image generation method according to claim 10, wherein at least one of the representation of the environment and a model of the object are updated based on multiple initial images acquired according to multiple distinct viewing angles.

22. The image generation method according to claim 1 is applied on all or part of a sequence of images forming a video.

23. The image generation method according to claim 22, wherein at least one of a representation of an environment and a model of the object are updated at each image of the sequence.

24. The image generation method according to claim 1, wherein the generation of the final image is generated in real time from the initial image.

25. A method of augmented reality intended to be used by an individual wearing a portable device on a face, comprising the steps of:
acquiring in real time a video of the individual wearing the portable device on the face;
displaying in real time the video in which an appearance of the portable device is entirely or partially modified by the image generation method as claimed in claim 1.

26. The method of augmented reality according to claim 25, wherein the portable device is entirely or partially suppressed in the video displayed in real time.

27. The method of augmented reality according to claim 25, wherein the portable device worn by the individual comprises a frame and corrective lenses adapted to a vision of the individual.

28. The method of augmented reality according to claim 25, wherein the individual wearing the portable device tries on a virtual object superimposed at least in part in the video on the portable device partially or totally suppressed.

29. The method of augmented reality according to claim 25, further comprising a step of initializing the model of the face of the individual based on at least one image of the individual not wearing the portable device on the face; or on multiple images of the individual wearing the portable device on the face, the images corresponding to different viewing angle of the face.

* * * * *